US011868947B2

(12) United States Patent
Taylor et al.

(10) Patent No.: US 11,868,947 B2
(45) Date of Patent: *Jan. 9, 2024

(54) SYSTEMS AND METHODS FOR SORTATION OF PRODUCTS USING A CONVEYOR ASSEMBLY

(71) Applicant: WALMART APOLLO, LLC, Bentonville, AR (US)

(72) Inventors: Robert J. Taylor, Rogers, AR (US); Matthew D. Alexander, Rogers, AR (US); William M. Propes, Bentonville, AR (US); John C. Crecelius, Jr., Springdale, AR (US); Jason D. Bellar, Bella Vista, AR (US)

(73) Assignee: WALMART APOLLO, LLC, Bentonville, AR (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/988,443

(22) Filed: Nov. 16, 2022

(65) Prior Publication Data

US 2023/0079572 A1 Mar. 16, 2023

Related U.S. Application Data

(63) Continuation of application No. 17/025,606, filed on Sep. 18, 2020, now Pat. No. 11,531,953, which is a (Continued)

(51) Int. Cl.
*G06Q 10/08* (2023.01)
*G06Q 10/083* (2023.01)
(Continued)

(52) U.S. Cl.
CPC ....... *G06Q 10/083* (2013.01); *G06K 7/10297* (2013.01); *G06K 7/1413* (2013.01); *G06Q 10/087* (2013.01); *G06Q 50/28* (2013.01)

(58) Field of Classification Search
CPC ..... G06Q 10/083; G06Q 10/087; G06Q 50/28
See application file for complete search history.

(56) References Cited

U.S. PATENT DOCUMENTS 3,456,773 A 7/1969 Titmas, Jr.
3,613,910 A 10/1971 Weir
(Continued)

FOREIGN PATENT DOCUMENTS

GB 2565017 1/2019
GB 2596431 12/2021
(Continued)

OTHER PUBLICATIONS

G. Black and V. Vyatkin, "Intelligent Component-Based Automation of Baggage Handling Systems With IEC 61499," in IEEE Transactions on Automation Science and Engineering, vol. 7, No. 2, pp. 337-351, Apr. 2010, doi: 10.1109/TASE.2008.2007216. (Year: 2010).*

(Continued)

*Primary Examiner* — Scott M Tungate
(74) *Attorney, Agent, or Firm* — Fitch, Even, Tabin & Flannery LLP

(57) ABSTRACT

In some embodiments, apparatuses and methods are provided herein useful to the sortation of products using a conveyor assembly. In some embodiments, there is provided a system for receiving and sorting products shipped to a shopping facility including: a delivery location at a shopping facility configured to receive a shipment of products; a conveyor assembly comprising: a product identification module configured to read identification data from an identification label disposed on a product; a plurality of sortation modules configured to move the product to one of a predetermined plurality of sortation destination areas; a control circuit operatively coupled to the product identification module and to each of the sortation modules, the control (Continued)

circuit configured to: receive the identification data from the product identification module; determine the sortation destination area for the product based at least on one of shopping facility data and shipping data regarding the product as sortation criteria; and cooperate with the plurality of sortation modules to move the product to the determined sortation destination area.

20 Claims, 14 Drawing Sheets

Related U.S. Application Data continuation of application No. 15/591,499, filed on May 10, 2017, now Pat. No. 10,810,534.

(60) Provisional application No. 62/336,064, filed on May 13, 2016, provisional application No. 62/336,087, filed on May 13, 2016, provisional application No. 62/336,051, filed on May 13, 2016, provisional application No. 62/336,080, filed on May 13, 2016.

(51) Int. Cl.
  *G06Q 10/087* (2023.01)
  *G06Q 50/28* (2012.01)
  *G06K 7/10* (2006.01)
  *G06K 7/14* (2006.01)

(56) References Cited

U.S. PATENT DOCUMENTS

| | | | |
|---|---|---|---|
| 3,621,973 A | 11/1971 | Carlson | |
| 3,771,679 A | 11/1973 | Theml | |
| 4,509,636 A | 4/1985 | Godbois | |
| 4,798,275 A | 1/1989 | Leemkuil | |
| 4,832,204 A | 5/1989 | Handy | |
| 4,962,841 A | 10/1990 | Kloosterhouse | |
| 4,988,435 A | 1/1991 | Kimura | |
| 5,188,210 A | 2/1993 | Malow | |
| 5,238,349 A | 8/1993 | Grace, Sr. | |
| 5,456,347 A | 10/1995 | Best | |
| 5,471,311 A | 11/1995 | Van Den Bergh | |
| 5,501,571 A | 3/1996 | Van Durrett | |
| 5,687,850 A | 11/1997 | Speckhart | |
| 5,779,023 A | 7/1998 | Hidai | |
| 5,783,810 A | 7/1998 | Kelly | |
| 5,793,633 A | 8/1998 | Noguchi | |
| 5,921,378 A | 7/1999 | Bonnet | |
| 5,984,078 A | 11/1999 | Bonnet | |
| 6,005,211 A | 12/1999 | Huang | |
| 6,230,872 B1 | 5/2001 | Huang | |
| 6,471,044 B1 | 10/2002 | Isaacs | |
| 6,505,733 B2 | 1/2003 | Troupos | |
| 6,554,123 B2 | 4/2003 | Bonnet | |
| 6,644,459 B2 | 11/2003 | Van Leeuwen | |
| 6,697,702 B1 | 2/2004 | Hahn-Carlson | |
| 7,118,034 B2 | 10/2006 | Baldassari | |
| 7,212,884 B2 | 5/2007 | Kappelgaar | |
| 7,221,276 B2 | 5/2007 | Olsen | |
| RE39,747 E | 7/2007 | Gordon | |
| 7,331,471 B1 | 2/2008 | Shakes | |
| 7,426,484 B2 | 9/2008 | Joyce | |
| 7,668,779 B2 | 2/2010 | Dewitt | |
| 7,695,235 B1 | 4/2010 | Rallis | |
| 7,819,260 B2 | 10/2010 | Leimbach | |
| 7,909,155 B2 | 3/2011 | Lupton | |
| 7,938,315 B2 | 5/2011 | Marks | |
| 7,984,809 B1 | 7/2011 | Ramey | |
| 8,060,243 B2 | 11/2011 | Ogawa | |
| 8,096,402 B2 | 1/2012 | Chastain | |
| 8,186,499 B2 | 5/2012 | Brandt | |
| 8,284,993 B2 | 10/2012 | Taylor | |
| 8,464,947 B2 | 6/2013 | Swan | |
| 8,489,232 B2 | 7/2013 | Mishra | |
| 8,575,507 B2 | 11/2013 | Pippin | |
| 8,655,484 B2 | 2/2014 | Stoll | |
| 8,684,169 B2 | 4/2014 | Itoh | |
| 8,738,177 B2 | 5/2014 | Van Ooyen | |
| 8,757,363 B2 | 6/2014 | Combs | |
| 8,855,806 B2 | 10/2014 | Hara | |
| 8,924,272 B2 | 12/2014 | Venkatasubramanian | |
| 8,949,148 B2 | 2/2015 | Kumar | |
| 9,004,287 B2 | 4/2015 | Liedl | |
| 9,010,654 B2 | 4/2015 | Bell | |
| 9,020,634 B2 | 4/2015 | Bailey | |
| 9,035,210 B1 | 5/2015 | Davis | |
| 9,141,928 B2 | 9/2015 | Pothukuchi | |
| 9,216,857 B1 | 12/2015 | Kalyan | |
| 9,275,293 B2 | 3/2016 | Broache | |
| 9,290,333 B2 | 3/2016 | Skanse | |
| 9,336,510 B2 | 5/2016 | Dearing | |
| 9,422,116 B1 | 8/2016 | Hase | |
| 9,475,653 B2 | 10/2016 | Dugat | |
| 9,827,598 B2 | 11/2017 | Robbins | |
| 10,087,002 B2 | 10/2018 | Shields | |
| 10,303,987 B2 | 5/2019 | Kotula | |
| 10,507,975 B2 | 12/2019 | Thomas | |
| 10,657,341 B2 | 5/2020 | Wilkinson | |
| 10,661,311 B2 | 5/2020 | Winkle | |
| 10,810,534 B2 | 10/2020 | Taylor | |
| 10,835,928 B2 | 11/2020 | Bellar | |
| 11,531,953 B2 | 12/2022 | Taylor | |
| 2002/0084173 A1 | 7/2002 | Paquette | |
| 2002/0092734 A1 | 7/2002 | Troupos | |
| 2003/0106771 A1 | 6/2003 | Takizawa | |
| 2003/0111320 A1 | 6/2003 | Van Leeuwen | |
| 2004/0069849 A1 | 4/2004 | Stevens | |
| 2004/0073333 A1 | 4/2004 | Brill | |
| 2004/0098272 A1 | 5/2004 | Kapsis | |
| 2004/0174244 A1 | 9/2004 | Eidemiller | |
| 2004/0243452 A1 | 12/2004 | Barton | |
| 2007/0000990 A1 | 1/2007 | Baldassari | |
| 2007/0261941 A1 | 11/2007 | Pelak | |
| 2008/0023302 A1 | 1/2008 | Groom | |
| 2008/0169170 A1 | 7/2008 | Brommer | |
| 2008/0169171 A1 | 7/2008 | Itoh | |
| 2009/0008450 A1 | 1/2009 | Ebert | |
| 2009/0043594 A1 | 2/2009 | Tseng | |
| 2009/0145723 A1 | 6/2009 | Ogawa | |
| 2009/0272624 A1 | 11/2009 | Edwards | |
| 2009/0294253 A1 | 12/2009 | Eisenberg | |
| 2010/0005011 A1* | 1/2010 | Dewey, Jr. | G06Q 10/0631 |
| | | | 705/28 |
| 2010/0322473 A1 | 12/2010 | Taylor | |
| 2011/0303564 A1 | 12/2011 | Pearson | |
| 2012/0101956 A1 | 4/2012 | Hyre | |
| 2012/0209741 A1* | 8/2012 | Bonner | G06Q 30/08 |
| | | | 705/26.3 |
| 2012/0259655 A1 | 10/2012 | Madreperla | |
| 2014/0100769 A1* | 4/2014 | Wurman | B65G 1/10 |
| | | | 705/22 |
| 2014/0258165 A1 | 9/2014 | Heil | |
| 2014/0262684 A1 | 9/2014 | Skanse | |
| 2014/0279272 A1 | 9/2014 | Inman | |
| 2015/0144536 A1* | 5/2015 | Dugat | B07C 5/36 |
| | | | 209/552 |
| 2015/0210484 A1 | 7/2015 | Itoh | |
| 2015/0259156 A1 | 9/2015 | Henry | |
| 2016/0083196 A1 | 3/2016 | Dugat | |
| 2016/0221766 A1 | 8/2016 | Schroader | |
| 2016/0221768 A1 | 8/2016 | Kadaba | |
| 2016/0232479 A1 | 8/2016 | Skaaksrud | |
| 2016/0275441 A1 | 9/2016 | Barber | |
| 2016/0342917 A1 | 11/2016 | Surapaneni | |
| 2017/0057756 A1 | 3/2017 | Dugat | |
| 2017/0091705 A1 | 3/2017 | Jones | |
| 2017/0330135 A1 | 11/2017 | Taylor | |
| 2018/0186577 A1 | 7/2018 | Messina | |
| 2018/0224837 A1 | 8/2018 | Enssle | |
| 2018/0253683 A1 | 9/2018 | Taylor | |
| 2018/0257872 A1 | 9/2018 | Kuhn | |

(56) References Cited

U.S. PATENT DOCUMENTS

| | | |
|---|---|---|
| 2018/0257873 A1 | 9/2018 | Aljoe |
| 2019/0031557 A1 | 1/2019 | Cela Greven |
| 2019/0270197 A1 | 9/2019 | Wagner |
| 2019/0315574 A1 | 10/2019 | Mehendale |
| 2019/0370745 A1 | 12/2019 | Bellar |
| 2020/0122928 A1 | 4/2020 | Bellar |
| 2020/0179981 A1 | 6/2020 | Bellar |
| 2020/0189852 A1 | 6/2020 | Karol |
| 2020/0189853 A1 | 6/2020 | Karol |
| 2020/0238339 A1 | 7/2020 | Bellar |
| 2021/0031238 A1 | 2/2021 | Bellar |

FOREIGN PATENT DOCUMENTS

| | | |
|---|---|---|
| WO | 2000000300 | 1/2000 |
| WO | 2005002747 | 1/2005 |
| WO | 2017196916 | 11/2017 |
| WO | 2020118171 | 6/2020 |

OTHER PUBLICATIONS

U.S. Appl. No. 62/466,085, Mar. 2, 2017, Robert James Taylor.
U.S. Appl. No. 62/466,095, Mar. 2, 2017, Robert James Taylor.
"Conveyors"; Superior Racking and Shelving Ltd.; http://superiorracking.ie/conveyors/; pp. 1-2.
"Dimensioning, Weighing & Scanning—Buyer's Guide"; Mettler-Toledo Cargosan; published in 2014; pp. 1-52.
Aruna, Y. V. et al.: "Automatic convey or System with In-Process Sorting Mechanism using PLC and HMI System"; Int. Journal of Engineering Research and Applications; vol. 5, Issue 11, (Part - 3); published Nov. 2015; pp. 37-42.
Belgianpost; "Taxipost: Automated Parcels Sorting—English"; https://www.youtube.com/watch?v=vN9XRIAys38; published Sep. 30, 2009; pp. 1-6.
Bytronic; "Single Convveyor Unit"; Bytronic Educational Technology; pp. 1-2.
Dabade, Sanjay, et al.; "Automatic Sorting Machine Using Conveyor Belt"; International Journal of Innovative and Emerging Research in Engineering; vol. 2, Issue 5; published in 2015; pp. 66-70.
Jones, Douglas; "Automated Receiving, Saving Money at the Dock Door"; Accu □ Sort Systems Inc.; pp. 1-11.
Mayer, Stephan H. "Development of a completely decentralized control system for modular continuous conveyors." Apr. 1, 2009. University of Karlsruhe, pp. 1-122. (Year: 2009).
Oladapo, Bankole, et al.; "Model design and simulation of automatic sorting machine using proximity sensor"; Engineering Science and Technology, an International Journal; publsihed May 9, 2016; pp. 1452-1456.
PCT; App. No. PCT/US2020/014878; International Search Report and Written Opinion dated Apr. 8, 2020.
PCT; PCT App. No. PCT/US2017/031867; International Search Report and Written Opinion dated Aug. 11, 2017.
Pulse Roller; ConveyLinx-Ai2 User's Guide Version 1.5; https://www.pulseroller.com/files/AS/Control%20Literature%20&%20Drawings/ConveyLinx%20Ai/Users%20Manual%20and%20Specifications/Users%20Guide.pdf; Jul. 2019; pp. 1-124.
Seibold, Zazilia et al.; "Layout-Optimized Sorting of Goods with Decentralized Controlled Conveying Modules"; Institute for Material Handling and Logistics, Karlsruhe Institute of Technology; pp. 1-6.
Tripathi, Anoop; "Warehouse Conveyor"; https://www.youtube.com/watch?v=QMdmmB_6PrQ; published Oct. 24, 2013; pp. 1-5.
USPTO; U.S. Appl. No. 15/591,499; Notice of Allowance dated Jun. 18, 2020, (pp. 1-9).
USPTO; U.S. Appl. No. 15/591,499; Office Action dated Feb. 3, 2020; (pp. 1-24).
USPTO; U.S. Appl. No. 15/591,499; Office Action dated Aug. 6, 2019; (pp. 1-26).
Vaughan, Mark; "Conveyor Sortation Systems"; http://www.plantengineering.com/search/searchsingledisplay/conveyorsortationsystems/df9a8557f0.html; published on Sept. 1, 1999; pp. 1-6.
Viscon; "Viscon Logistics—Sorting Systems"; https://www.youtube.com/watch?v=O00gDoGXN98; published on Sep. 18, 2014; pp. 1-5.
UKIPO; App No. GB2112112.4; Examination Report dated Jun. 10, 2022; 4 pages.
USPTO; U.S. Appl. No. 17/025,606; Non-Final Rejection dated May 6, 2022; (pp. 1-6).
PCT; App No. PCT/US19/64915; International Search Report and Written Opinion dated Feb. 25, 2020.
USPTO; U.S. Appl. No. 16/706,310; Final Rejection dated Jun. 22, 2022; (pp. 1-13).
Hayslip, Nunzio. A Reconfigurable Simulator for Coupled Conveyors. Diss. University of Akron, 2006. (Year: 2006).
USPTO; U.S. Appl. No. 17/025,606; Notice of Allowance and Fees Due (PTOL-85) dated Aug. 22, 2022; (pp. 1-7).
USPTO; U.S. Appl. No. 16/706,310; Non-Final Rejection dated Feb. 23, 2022; (pp. 1-21).
PCT; App. No. PCT/US2019/064915; International Search Report and Written Opinion dated Jun. 17, 2021.
UKIPO; App No. GB2112112.4; Examination Report dated Sep. 2, 2022, 4 pages.
USPTO; U.S. Appl. No. 16/706,310; Non-Final Rejection dated Nov. 15, 2022; (pp. 1-17).

* cited by examiner

SYSTEMS AND METHODS FOR SORTATION OF PRODUCTS USING A CONVEYOR ASSEMBLY

CROSS-REFERENCE TO RELATED APPLICATIONS

This application is a continuation application of U.S. application Ser. No. 17/025,606, filed Sep. 18, 2020, which is a continuation application of U.S. application Ser. No. 15/591,499, filed May 10, 2017, now U.S. Pat. No. 10,810,534, which claims the benefit of U.S. Provisional Application No. 62/336,051, filed May 13, 2016, U.S. Provisional Application No. 62/336,064, filed May 13, 2016, U.S. Provisional Application No. 62/336,080, filed May 13, 2016, and U.S. Provisional Application No. 62/336,087, filed May 13, 2016, which are all incorporated herein by reference in their entirety.

TECHNICAL FIELD

This invention relates generally to the sortation of products using a conveyor assembly, and more particularly, to the sortation of products using a modular conveyor assembly at a shopping facility.

BACKGROUND

In the retail setting, the delivery, unloading, and sorting of products at a shopping facility is an important component of the efficient operation of the shopping facility. This procedure frequently involves the use of a conveyor assembly to sort the various types of products into appropriate categories for transport to various parts of the shopping facility. In some conventional approaches, this delivery, unloading, and sorting process has been a completely manual process. In some forms, this process has involved the use of a conveyor assembly in which some employees load products onto and push the products down the conveyor assembly and in which other employees determine the destination of each product and take the product from the line to the destination. This manual process can be a labor intensive approach that may require a significant amount of employee time to complete the unloading and sorting and may also require a significant amount of training. Further, it may lead to sorting mistakes resulting from human error.

Many shopping facilities have limited and/or changing space in back room areas for receiving shipments of products. Further, the dimensions and geometric arrangements of these back rooms may vary from one shopping facility to another. It is desirable to use a modular conveyor assembly that can be reconfigured to accommodate these different back room geometries. Also, it would be desirable to use a conveyor assembly composed of modules that can be easily interchanged or replaced with other modules.

In addition, shopping facilities often have changing needs with respect to the sorting, arrangement, and/or distribution of products within the shopping facility. It would be desirable to identify a product being sorted and to use a flexible, automated sorting process that can easily change sortation criteria based on various categories of data relating to that product at the shopping facility. In some conventional processes, sorting destinations may be determined at distribution centers prior to shipment and included in product labels. In such instances, the data used as sortation criteria may be outdated, i.e., the data used for sorting may be days old by the time products arrive at the shopping facility. So, it would also be desirable to use real-time data relating to the shipment of products being received as sortation criteria.

BRIEF DESCRIPTION OF THE DRAWINGS

Disclosed herein are embodiments of systems, apparatuses and methods pertaining to the sortation of products using a modular conveyor assembly. This description includes drawings, wherein.

Figure 1:
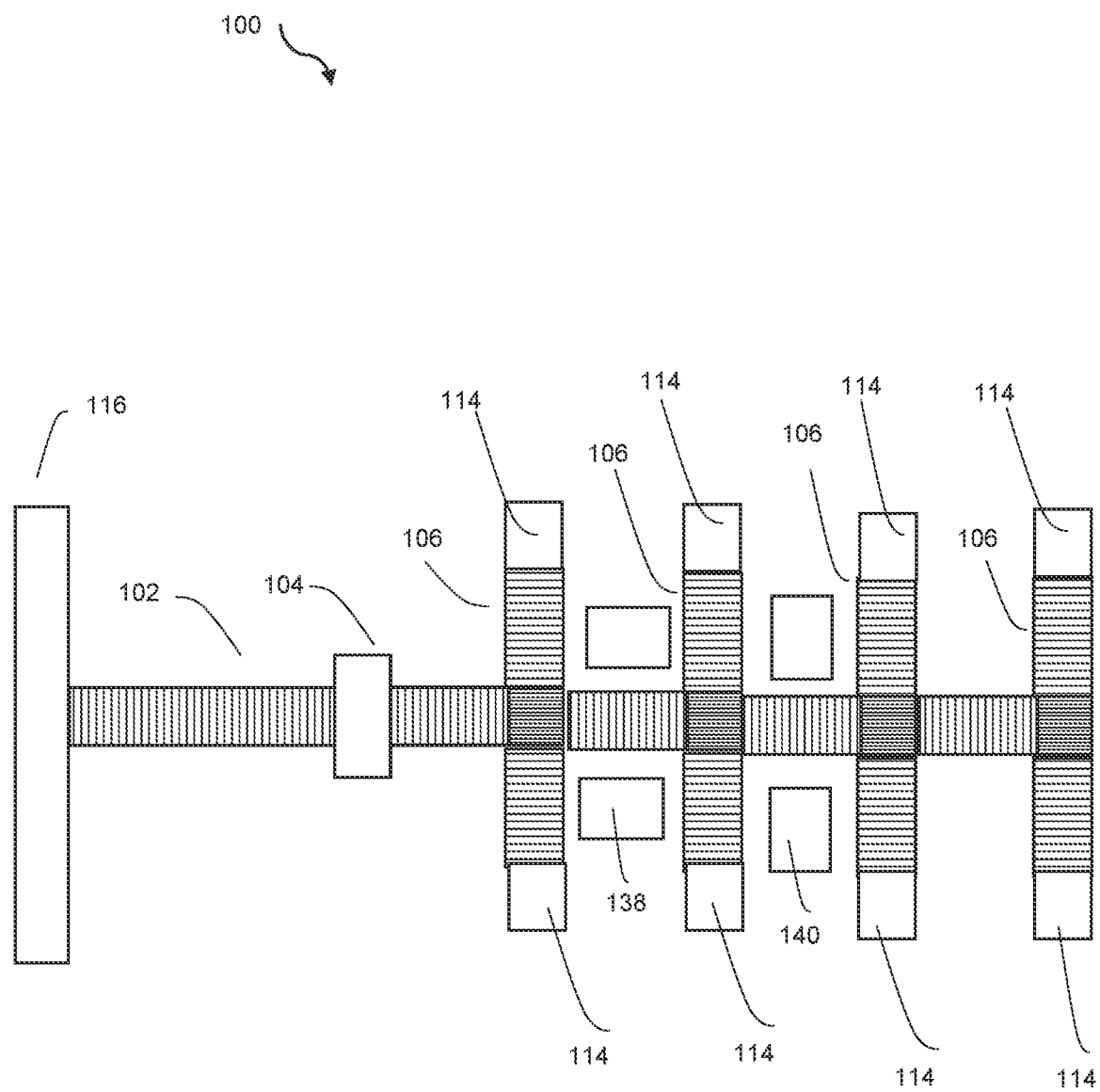
FIG. 1 is a top plan view of a schematic representation of a conveyor assembly in accordance with some embodiments.
Figure 2:
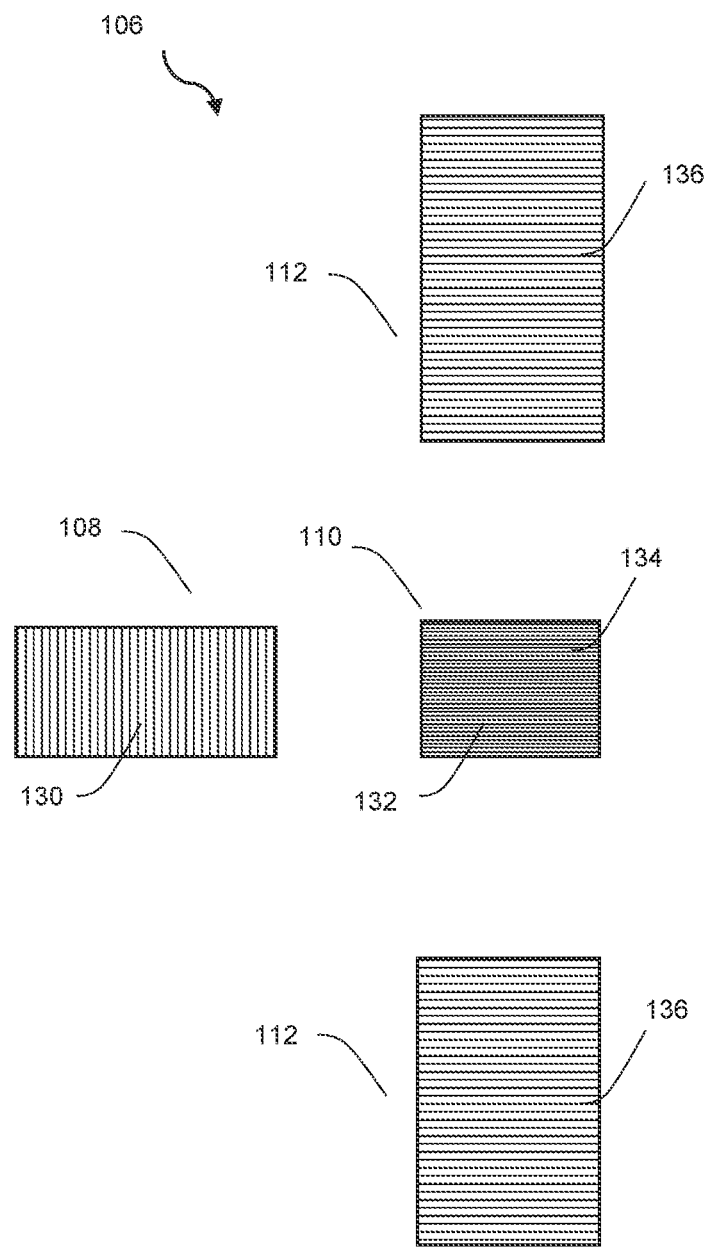
FIG. 2 is a top exploded plan view of a schematic representation of a sortation module in accordance with several embodiments.
Figure 3:
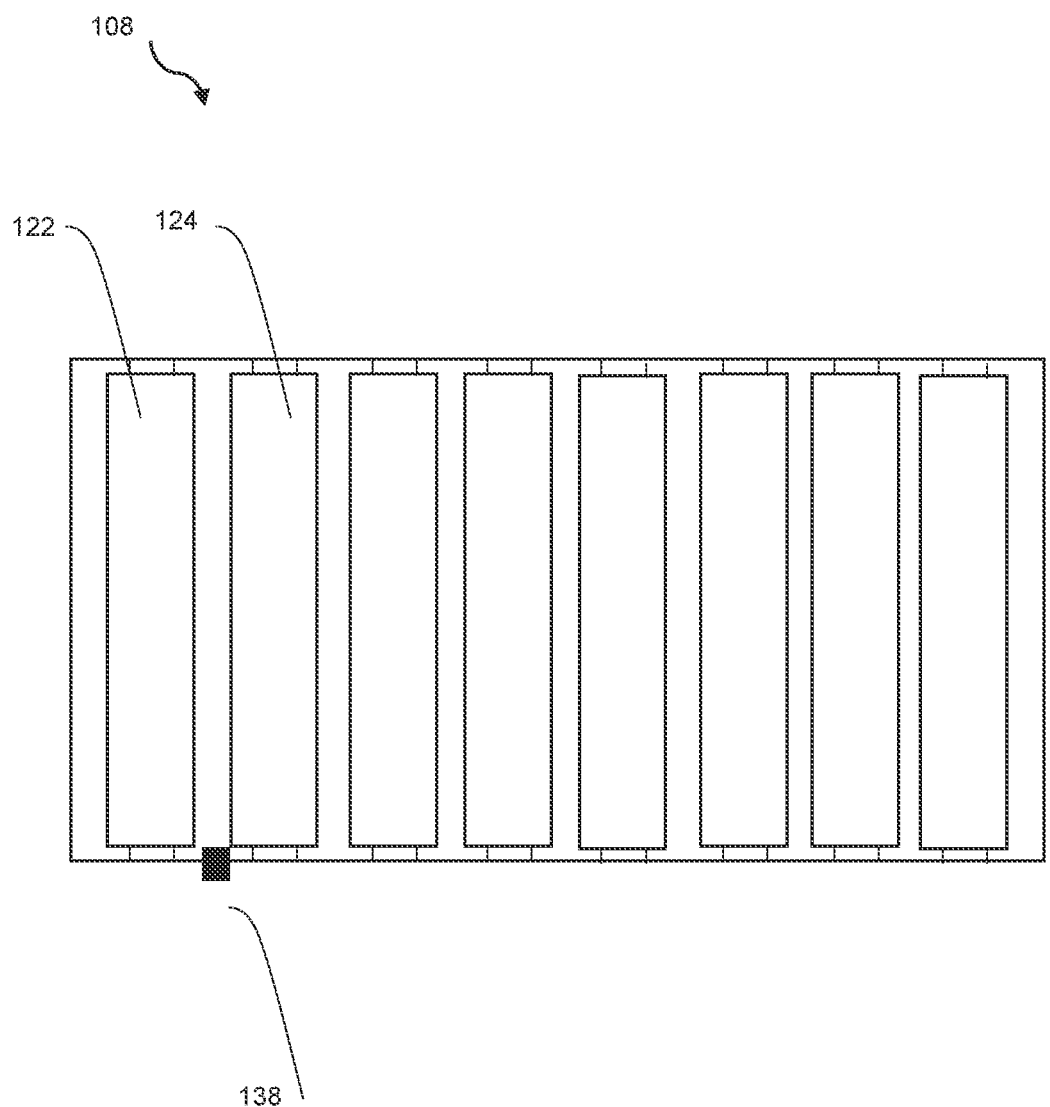
FIG. 3 is a top plan view of a schematic portion of a conveyor assembly in accordance with some embodiments.
Figure 4:
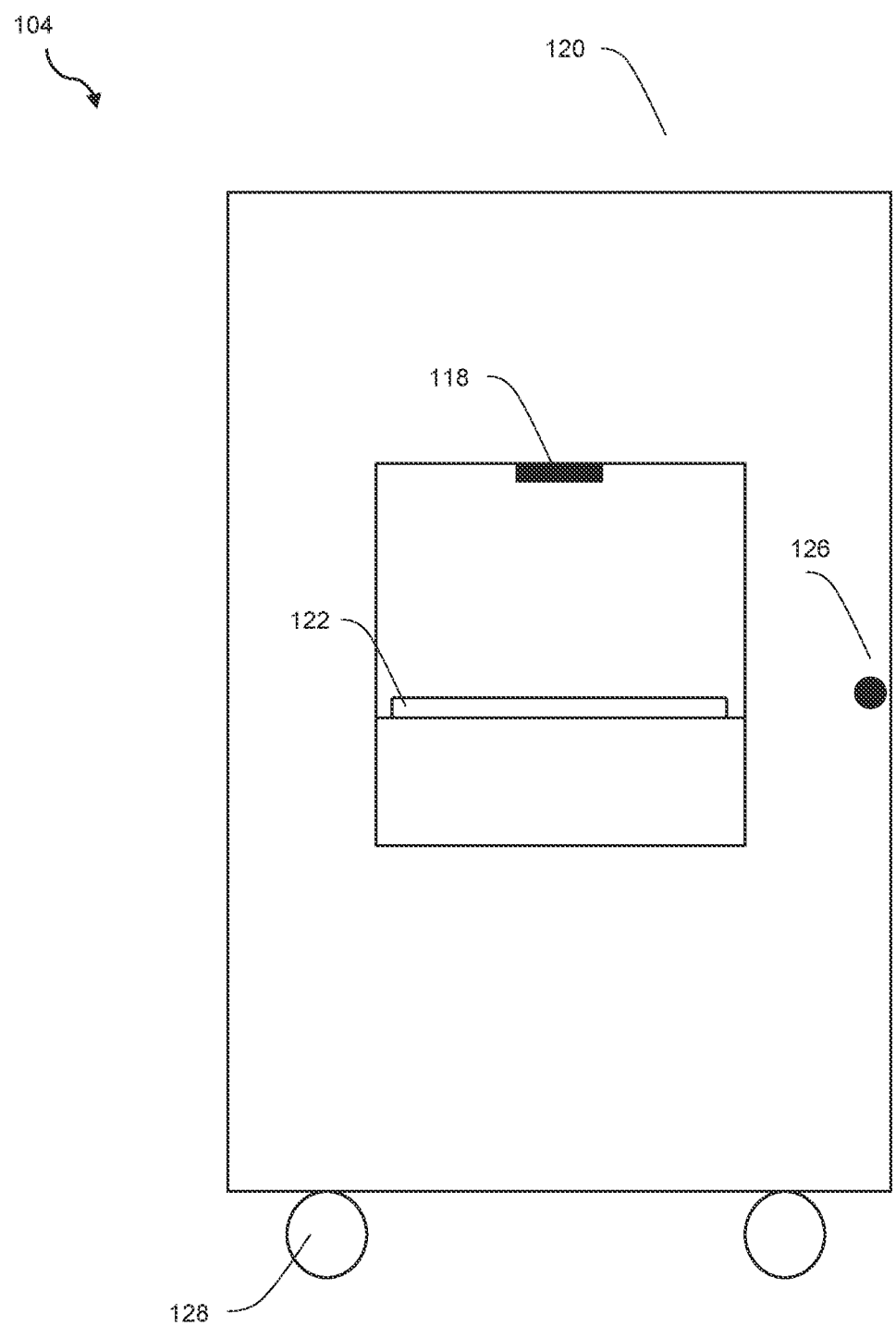
FIG. 4 is a side elevational view of a schematic representation of a product identification module in accordance with several embodiments.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

Generally speaking, pursuant to various embodiments, systems, apparatuses and methods are provided herein useful for the sortation of products using a conveyor assembly. In one form, there is provided a system for receiving and sorting products shipped to a shopping facility including: a delivery location at a shopping facility configured to receive a shipment of products; a conveyor assembly including: a product identification module configured to read identification data from an identification label disposed on a product; a plurality of sortation modules configured to move the product to one of a predetermined plurality of sortation destination areas; a control circuit operatively coupled to the product identification module and to each of the sortation modules, the control circuit configured to: receive the identification data from the product identification module; determine the sortation destination area for the product based at least on one of shopping facility data and shipping data regarding the product as sortation criteria; and cooperate with the plurality of sortation modules to move the product to the determined sortation destination area.

In one form the delivery location may include a loading dock at the shopping facility configured to receive delivery vehicles. Further, the product identification module may include a scan tunnel or arm positioned above or adjacent one of the plurality of sortation modules. In addition, the conveyor assembly may further include: a plurality of powered rollers disposed at predetermined locations along the conveyor assembly; and a plurality of sensors disposed at predetermined locations along the conveyor assembly to detect positions of the product. Also, the control circuit may be operatively coupled to the plurality of powered rollers and to the plurality of sensors, the control circuit configured to activate a powered roller to adjust the speed of the product to maintain a predetermined minimum separation distance between it and an adjacent product.

In one form, the product identification module and plurality of sortation modules may be reconfigurable for coupling to one another to define different geometric arrangements of the conveyor assembly. Further, the control circuit may track the positions of the plurality of destination areas after the sortation modules are interchanged or reconfigured. In addition, the system may further include an operator interface configured to control the conveyor assembly.

In another form, there is provided a method for receiving and sorting products shipped to a shopping facility including: receiving a shipment of products at a delivery location at a shopping facility; depositing a product on a conveyor assembly; reading identification data from an identification label disposed on the product; moving the product along the conveyor assembly; by a control circuit, receiving the identification data from the product identification module; by the control circuit, determining the sortation destination area for the product from among a predetermined plurality of sortation destination areas based at least on one of shopping facility data and shipping data regarding the product as sortation criteria; and moving the product to the determined sortation destination area.

In one form, the method may further include unloading the shipment of products from a delivery vehicle. In addition, the method may further include transporting the product from the determined sortation destination area to a corresponding location for the product in the shopping facility.

In one form, the method may further include, by the control circuit, selectively determining the sortation destination area based on the sales location of the product in the shopping facility. Moreover, the method may further include, by the control circuit, selectively determining the sortation destination area based, at least in part, on shopping facility inventory information regarding the product. Also, the method may further include, by the control circuit, selectively determining the sortation destination area based, at least in part, on current product availability information at the shopping facility. In addition, the method may further include, by the control circuit, selectively determining the sortation destination area based on the quantity of the product delivered in the shipment of products.

Currently, many receiving processes (i.e., unloading and sorting) are manual processes. In some forms, prior to delivery, employees may arrange a sorting area by positioning carts and pallets at specific destination locations. For example, some pallets may be intended to hold products that are destined for aisle displays and/or promotions. When a delivery vehicle arrives at the shopping facility with a shipment, the products may be unloaded onto a relatively fixed and stationary conveyor extending linearly and may be manually pushed downstream along the conveyor surface. In some conventional processes, the employee may have to read the identification label to identify the product and may then have to make a decision as to the appropriate destination location. Individuals may randomly remove cases of products from the conveyor and may haphazardly seek out the appropriate destination location. Once all of the products are unloaded, they may then be moved from the destination location to an appropriate location within the shopping facility.

This manual receiving process (including unloading, conveying, and sorting) presents a number of disadvantages. It is a labor intensive process and presents staffing issues. Further, the manual nature of the work (involving frequent lifting and carrying of cases of products) presents the potential for workplace injuries. Further, there may be little prioritization in the process, and an out-of-stock or low-inventory product may sit in a receiving area for some time before it is stocked on a shelf.

Initially, there is described below a general structure for a conveyor assembly 100. Some of the types of structures used with conveyor assemblies (and their operation and function) are fairly well-known and require little discussion. Further, there are available many types of different structures that can perform the same general conveyor operation and function. Accordingly, the initial description below address general structure, operation, and function to provide suitable context. Schematic representations of portions of a conveyor assembly are therefore included with the understanding that conveyor structure is fairly well-known and various structures are available.

Referring to FIGS. 1-4, there is shown a schematic representation of an exemplary conveyor assembly 100 and components thereof. The conveyor assembly 100 is composed of various modules, and in one form, it may include an initial conveyor module 102, a product identification module 104, and a plurality of sortation modules 106 (FIG. 1 shows four sortation modules 106). Rollers on these modules 102, 104, and 106 may collectively define the conveying surface of the conveyor assembly 100. In this form, products in cases (or other containers) may be unloaded from a delivery vehicle at a delivery location 116 (such as at the loading dock of a shopping facility) and may be deposited on the initial conveyor module 102, which serves as a staging area for products passing through the product identification module 104. The initial conveyor module 102 may be coupled to or positioned adjacent to the product identification module 104. In another form, multiple delivery vehicles may be unloaded simultaneously, and the initial conveyor module 102 may serve as a way to funnel the products so that only one product passes through the product identification module 104 at a time. In another form, the conveyor assembly 100 may not include an initial conveyor module 102 at all, and products may instead be unloaded directly from a delivery vehicle onto the product identification module 104 one at a time.

So, in one form, it is generally contemplated that the products in a shipment to the shopping facility will be unloaded from a delivery vehicle and placed on the conveyor assembly 100. The cases may pass through the product identification module 104 and may have identification labels positioned and oriented on the cases so as to be read by the product identification module 104. When passing through the module 104, the product will be identified and sorted along the conveyor assembly 100 to one of several destination areas 114, pursuant to any of various adjustable sortation criteria. As described further below, in some forms, a product identification module 104 is not required at all. Instead, in some forms, a hand scanner may be used to identify the product, and the product may then be loaded on the sortation modules 106 or a conveyor portion (such as a powered, flexible or fixed length roller) to the first sortation module 106.

If present, the product identification module 104 generally reads identification data from an identification label disposed on a product passing through or adjacent the module 104. The product identification module 104 may include one or more of any of various sorts of readers 118 suitable for reading various types of labels, including a bar code reader, an RFID reader, an NFC reader, a laser imager, an optical sensor, an image processor, or a text capture device. Generally, the label and product may have to be oriented in a certain configuration, such as facing upwardly and extending horizontally, so as to be readable by the reader 118. In addition, the product identification module may include multiple readers that are configured to read various orientations of the labels. Alternatively, some types of readers may not be limited by the orientation of the label.

In one form, the product identification module 104 may be in the shape of a scan tunnel or arm 120. The product identification module 104 may include a plurality of rollers 122 for moving the products through the module 104. Further, at least one of the rollers 122 may be a powered roller 124 in order to propel the products through the module 104. An operator interface 126 may be coupled to a control circuit that activates the powered roller(s) to move the products through the module 104. The product identification module 104 may also include support wheels 128, which facilitate mobility and storage of the module 104 when the conveyor assembly 100 is not in use. As should be evident, the product identification module 104 may be any of various shapes, dimensions, and types.

As the products pass through the module 104, the product identification label is read and the product is identified. As used herein, the phrase product identification label refers broadly to any sort of product identifier, such as, for example, graphics that are machine readable. Additional data regarding the product may also be included on the label and may be read by the module 104, as addressed further below. This identification data (and any additional data) may be used in the sortation process to determine a destination area 114 for the product, as addressed below.

In turn, the product identification module 104 is coupled to a sortation module 106. Each sortation module 106 is then coupled to another sortation module 106 to form a sequential arrangement of modules 106. The modules 104 and 106 may be coupled in any appropriate manner. For example, they may simply be arranged side-by-side, or they may be fastened to one another to prevent misalignment of the modules 104 and 106. The number of sortation modules 106 may be selected so as to fit within the size of space available to the conveyor assembly 100, and thereby, the conveyor assembly 100 is adjustable in size and orientation by the addition or subtraction of one or more modules 106.

In one form, the sortation modules 106 are generally identical and interchangeable. Each sortation module 106 may include a travel portion 108, a sorting portion 110, and a coupling portion 112. The travel portion 108 may be uni-directional and include a plurality of rollers 130 configured to propel the product in a first (or forward) direction along the rollers. Uni-directional generally refers to the capability to move the products in a forward or backward direction. The shape of the sortation module may be adjusted to accommodate space limitations. For example, the sortation module 106 may be T-shaped with two coupling portions 112 or may be L-shaped with one of the coupling portions 112 folded down or removed.

In one form, the sorting portion 110 is bi-directional and may include a first set of longitudinal rollers 132 configured to propel the product in the first (or forward) direction and a second set of longitudinal rollers 134 to divert the product in a second direction (or sideways) to a sortation destination area 114. In one form, it is contemplated that a control circuit may cause the second set of rollers to "pop up," or elevate, when a product is to be diverted to a destination are. Further, it is generally contemplated that there will be two destination areas 114 for each sorting portion 110 (one to the left and one to the right), and the second set of rollers 134 are rotatable in a clockwise or counterclockwise manner so as to divert the product to one of these two destination areas 114. If the product is to proceed in the first (or forward) direction, it is propelled in that direction by the first set of rollers 132, and the second set of rollers 134 do not "pop up."

In FIG. 1, the sortation module 106 is shown with the travel portion 108 arranged before the sorting portion 110. However, it should be understood that this arrangement may be reversed so that the product reaches the sorting portion 110 and may then proceed in any one of three directions, i.e., straight along the travel portion 108 or sideways along one of the coupling portions 112. In some instances this arrangement may have the advantage of provided for three destination areas 114 (rather than just two).

Further, it should be understood that this type of conveyor assembly 100 is just one example. This disclosure addresses various features of the conveying and sorting process, and these features may not rely on any specific type of conveyor assembly. For example, although rollers are described, in some forms, the conveyor assemblies may use other conveying structures, such as belts, in addition to or in lieu of rollers. As another example, although certain diverting technology is described (sorting portion 110), other ways of diverting products may also be used, such as tilting of conveyor portions.

In summary, the sorting portion 110 can sort products in multiple directions (e.g., left or right). In some implementations, each sorting portion 110 can include a first set rollers 132 to allow products to travel in a first direction along the conveyor assembly 100, and separate pop-up rollers 134 that are activated to direct the product in one of the multiple directions. Sensors can detect when the product is approaching and/or on the sortation module 106, and the control circuit can activate the sortation module 106 (e.g., signal to raise the pop-up rollers 134) and a direction to route. A sensor can detect when the product is off of the sortation module 106 to deactivate the sorting portion 110 (e.g., a photo-eye to cause the pop-up rollers to lower). When the product does not need to be diverted, the product may pass straight onto a subsequent outbound sortation module 106.

The coupling portion 112 includes a plurality of rollers 136 and connects the sorting portion 110 to a destination area 114. It is generally contemplated that there may be two coupling portions 112 for each sortation module 106 with each coupling portion 112 ending in a destination area. Further, the each coupling portion 112 is preferably adjustable in length to accommodate different space limitations for the conveyor assembly 100. It is also preferably collapsible to facilitate storage of the sortation module 106 when not in use. For example, the coupling portions 112 may be foldable with respect to the sorting portion 110, and/or the travel portion 108 may be foldable with respect to the sorting portion 110. Further, the sortation module 106 may include support wheels to also facilitate storage of the module 106.

In one form, the destination areas 114 may simply be the ends of the coupling portions 112. For example, prior to sorting, pallets 138 and carts 140 may be arranged adjacent to the ends of the coupling portions 112, and when the sorting is completed, the products in each destination area 114 may be moved to a corresponding pallet 138 or cart 140. Alternatively, the destination areas 114 may be the carts 138 or pallets 140 themselves and may be entirely separate from the coupling portions 112.

Generally, the sortation modules 106 may constitute a unitary structure, in which each module 106 include the travel portion 108, the sorting portion 110, and two coupling portions 112. However, as should be evident, the sortation modules 106 need not be a unitary structure. Instead, the sortation module 106 may include separate and/or separable travel, sorting, and/or coupling units. They may be assembled or fashioned together in some manner or simply disposed adjacent of one another.

The conveyor assembly 100 may be composed of various arrangements powered rollers and non-powered rollers. Non-powered rollers may be coupled to powered rollers in some way, such as by a belt. In one form, it is contemplated that each sortation module 106 includes at least one powered roller 124 with an adjustable rotation speed to maintain a minimum distance between adjacent products. In other words, the control circuit detects the positions of products on the conveyor assembly 100 and may vary the speed of individual rollers or groups of rollers in order to effectively sort/divert individual products or cases to a specific destination. For example, the travel portion 106 may include a powered roller 124, and adjustment of the rotation speed of this powered roller 124 may cause a product traveling on the roller surface to speed up or slow down. The conveyor assembly 100 may maintain a minimum distance between adjacent products through the use of a plurality of sensors 138 disposed at predetermined locations on the plurality of sortation modules 106 to detect positions of the products traveling along the sortation modules 106. In one form, the sensors 138 may be optical sensors (or any of various other sensor types) spaced equidistantly along the conveyor assembly 100 that detect products. In this form, the control circuit may be operatively coupled to powered rollers 124 to adjust their rotational speeds. The control circuit may cooperate with the sensors to determine the position of a product relative to an adjacent product and may activate a powered roller 124 to adjust the speed of the product to maintain a certain minimum separation distance between these adjacent products.

In one form, there is disclosed a system 200 including a conveyor assembly 201 having sortation modules 206 that are readily reconfigurable to adjust to changing or disparate space limitations. So, for example, the conveyor assembly 201 may be reconfigured for use in the back room of a shopping facility with changing space limitations. Alternatively, the conveyor assembly 200 may be the basis for a standardized model used in different back rooms with different space limitations and that may be reconfigured differently for each shopping facility. This conveyor assembly 201 is a scaled down model and is configurable. In the shopping facility context, space is often at a premium in the back rooms of stores, so the modular nature is an advantage.

The modular conveyor system 200 enables multiple different sortation modules 206 to be coupled together to form a conveyor assembly 201 intended to be utilized with a product sorting system that autonomously sorts products being unloaded from delivery trucks at a shopping facility. The sortation modules 206 can easily be decoupled to allow for easier storing and to allow the conveyor assembly 201 to be moved out of the way when not in use (e.g., in the back storage area of the shopping facility). When the sortation modules 206 are coupled together, their positions can be automatically determined along the conveyor assembly 201 and/or relative to one or more other sortation modules 206 without manual inputs (e.g., if module A is supposed to be placed before module B, but is instead placed after module B, module A and module B will reconfigure sortation destinations to match the physically/geometrically correct sort destinations). The sortation modules 206 need not be arranged in a specific order or arrangement of modules. System 200 involves interchangeable sortation modules 206, and an initial conveyor module and/or a product identification module (such as described above) are optional.

Figure 5A:
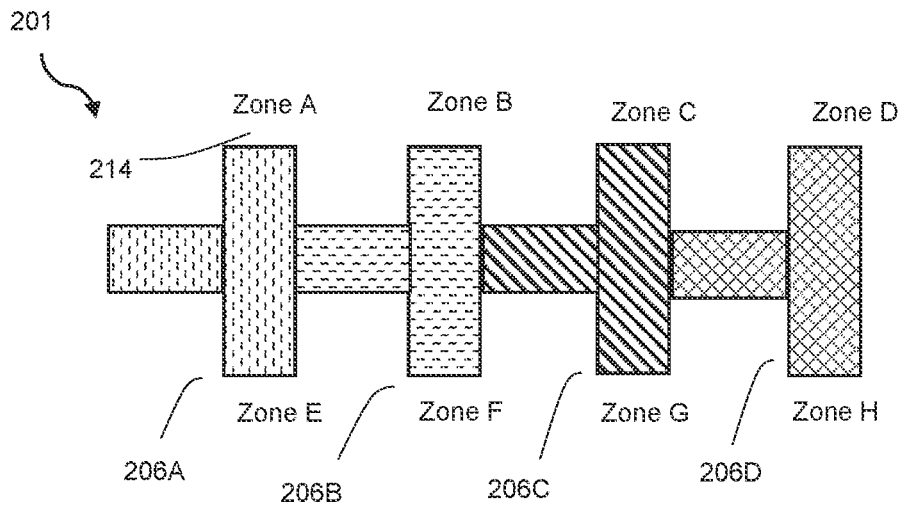
FIGS. 5A and 5B are top plan views of schematic representations of an arrangement of sortation modules in accordance with some embodiments.
Figure 5B:
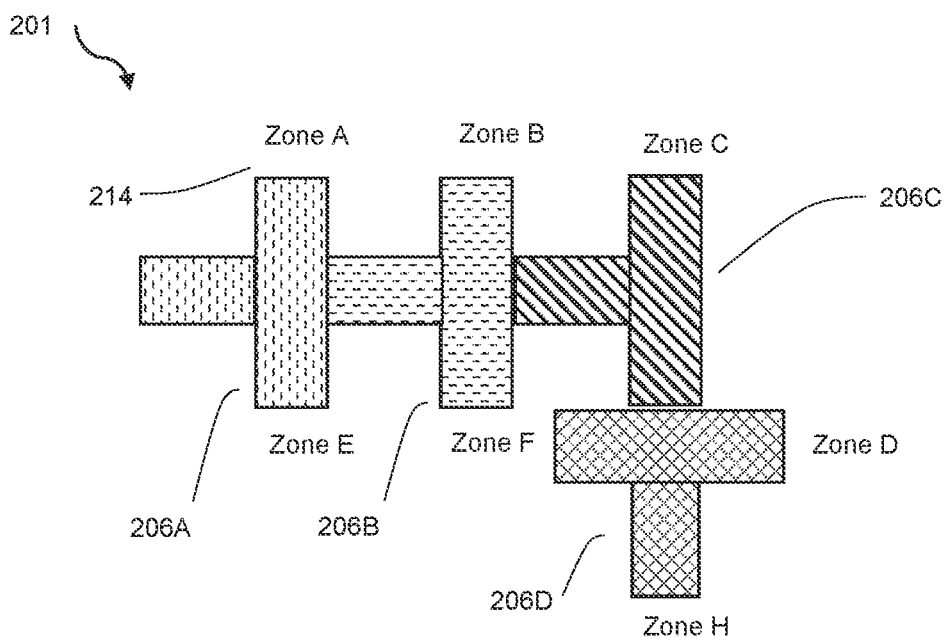

An example is shown in FIGS. 5A and 5B. FIG. 5A is a schematic diagram showing four sortation modules 206A, B, C, D extending sequentially from left to right in a linear arrangement. Of course, one or more sortation modules 206 may be added or removed to alter the length. Also, one or more of the coupling portions 212 may be folded down to accommodate irregular spaces. FIG. 5B is a schematic diagram in which the arrangement conveyor assembly 201 has been modified to a branched form. In this form, the fourth sortation module 206D has been shifted to a new downward position off of a coupling portion 212 of the third sortation module 206C.

Another advantage of the conveyor assembly 201 is that it tracks destination areas (or zones) 214 even when one sortation module 206 is replaced or interchanged with another sortation module 206. More specifically, a control circuit 216 and/or the sortation modules 206 themselves are able to track the positions of the sortation module 206 and adjust the operation of the units accordingly to send products to the correct destination area (or zone) 214, such as within the back room of a shopping facility. In this context, the term control circuit 216 refers broadly to any microcontroller, computer, or processor-based device with processor, memory, and programmable input/output peripherals, which is generally designed to govern the operation of other components and devices. It is further understood to include common accompanying accessory devices, including memory, transceivers for communication with other components and devices, etc. These architectural options are well known and understood in the art and require no further description here. The control circuit 216 may be configured (for example, by using corresponding programming stored in a memory as will be well understood by those skilled in the art) to carry out one or more of the steps, actions, and/or functions described herein.

Figure 6A:
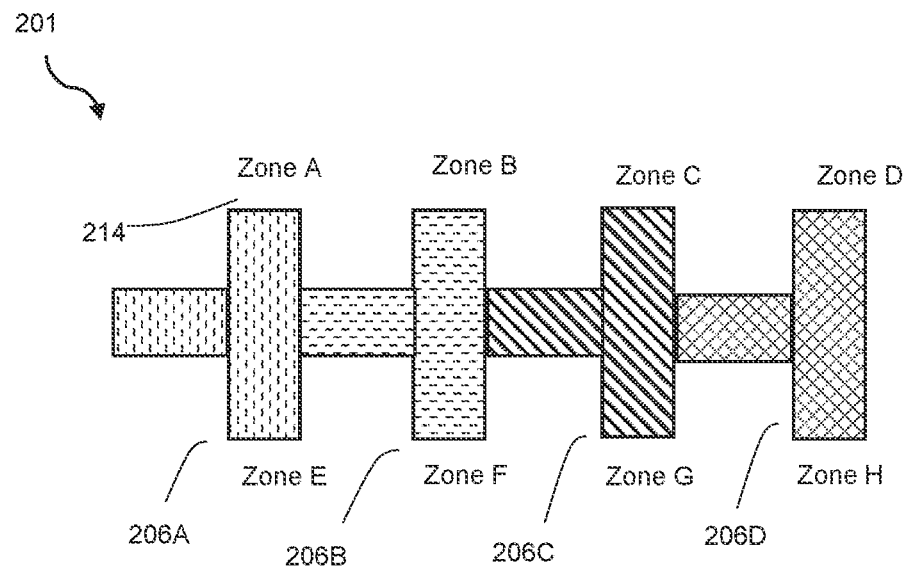
FIGS. 6A and 6B are top plan views of schematic representations of an arrangement of sortation modules in accordance with several embodiments
Figure 6B:
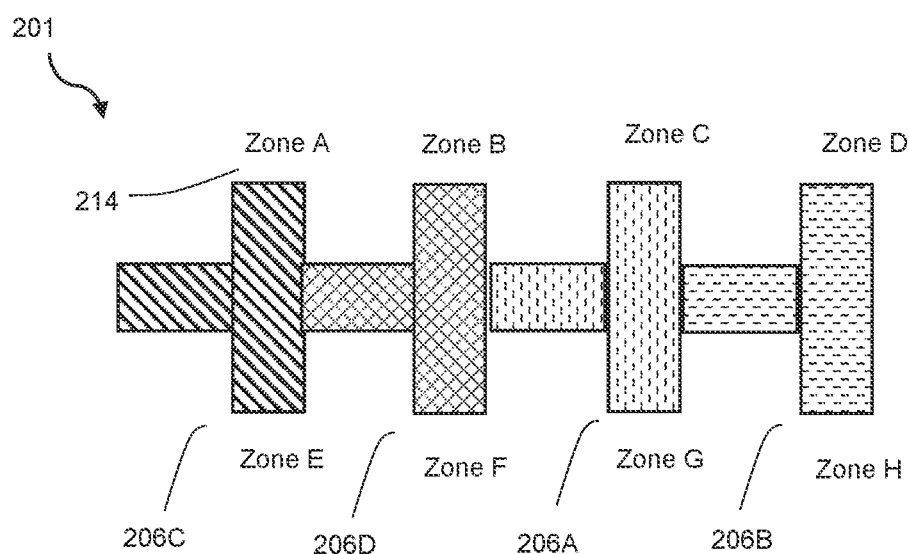

Another example is shown in FIGS. 6A and 6B. FIG. 6A is a schematic diagram again showing the four sortation modules 206A, B, C, D extending sequentially from left to right in a linear arrangement. In this form, there are a total of eight destination areas (or zones) with Zones A and E corresponding to sortation module 206A, Zones B and F corresponding to sortation module 206B, Zones C and G corresponding to sortation module 206C, and Zones D and H corresponding to sortation module 206 D. In FIG. 6B, the sortation modules have been rearranged so that they are in the following sequential order from left to right: 206C, 206D, 206A, and 206B. It is generally contemplated that, in preparation for each unloading option, the sortation modules 206 will be removed from a storage area where they may be arranged haphazardly. When they are set up for unloading, it is contemplated that they will be arranged in the desired geometric pattern (for example, linearly) without regard to how they have been arranged in past unloading operations. As can be seen in FIGS. 6A and 6B, it is contemplated that the destination areas (or zones) 214 will remained fixed or constant regardless of the new relative positions of the sortation modules 206.

It is also contemplated that the system 200 is arranged for automatic dynamic configuration based on a reduced number of modules. Essentially, if a sortation module 206 becomes impaired and is not replaced, the system 200 may distribute products to the remaining destination areas (or zones) based on certain criteria. For example, the control circuit 216 may be configured to select an alternative destination area 214 based on destination "load" (the alternative destination area 214 is expected to receive a low number of product cases) or product sales floor location (the sales floor location of products sent to the alternative destination area 214 is close to the sales floor location of products send to the impaired module 206). In one approach, this reconfiguration may be predetermined, i.e., a specific default profile may be created to address a specific reduction in the number of available destination areas 214.

This automatic dynamic configuration approach may arise in several situations. First, the forward conveyor portion of the sortation module 206 may be operational, but the divert portion may not be working. So, the impaired sortation module 206 may still deliver products to other sortation modules 206. Second, if the impaired module 206 is completely non-functional and no replacement module is available, it can be removed from the conveyor assembly 201, and the destination areas 214 can be reconfigured. In both of these examples, the number of available destination areas 214 is reduced, so the system 200 provides for automatic dynamic configuration to send affected products to new destination areas 214.

It is generally contemplated that the determination of the positions of the sortation modules 206 may be determined when the conveyor assembly 201 is powered up via an operator interface for an unloading and sorting operation. In one form, it is contemplated that the control circuit 216 includes a controller core 218 that communicates with each sortation module 206A, 206B, 206C, and 206D to track the position of each sortation module. Alternatively, or in addition, it is contemplated that each sortation module 206A, 206B, 206C, and 206D may also communicate with other sortation modules to track the position of each sortation module relative to one another. The sortation modules 206 may include sensors and/or separate controllers to facilitate the detection of their relative positions.

In one form, this disclosure describes the use of a controller core 218. This core may be housed at or near the conveyor assembly 201 itself, such as inside the product identification module 204. However, it is also contemplated that control may be handled remotely. In one example, the system 200 may include an input/output hub that communicates wirelessly with a shopping facility server facility or a cloud computing system using remote server(s). In this example, processing would occur remotely, not at the conveyor assembly 201.

The determination of the presence and/or positions of the sortation modules 206 may be handled in various ways. One approach is to employ a master/slave architecture with two way communication. In one example, the control circuit 216 may include a controller core 218 that queries each sortation module 206, i.e., the core 214 transmits a signal to each sortation module 206 and, in response, each sortation module 206 transmits a return signal. In other words, the system 200 may utilize a query/response model with the main core 218 making a query to each sortation module 206 and expecting a response from it to ascertain the position of the modules 206 installed in the system 200. Characteristics of these signals, or simply their presence, may be used by the core 218 to determine the relative positions of the sortation modules 206, i.e., that sortation module 206B is downstream of sortation module 206A.

Alternatively, in another example, each sortation module 206 may be configured to automatically transmit a signal upon being powered up. In other words, each sortation module 206 may self-detect its installation and position and announce its presence and position to the controller core 218. This approach may rely on one-way communication to establish position. Optionally, this approach could have each sortation module 206 continue to transmit a signal at predetermined time intervals until receiving some sort of acknowledgment signal from the controller core 218. In other words, if the sortation module 206 does not receive an acknowledge message back from the core 218, the module 206 will wait a period of time (either random or fixed duration) and make another announcement attempt.

In another form, sensors or separate controllers of the sortation modules 206 may be "daisy chained" together so that the each sortation module 206 communicates with the other sortation modules 206, i.e., sortation module 206B "knows" that it is downstream of sortation module 206A. In other words, separate controllers may provide some sort of query/response signals or announcement signal amongst each other to determine relative positions. This approach may also involve communications and signals to the controller core 218. Under any approach, this determination of relative position also enables the use of spare sortation modules 206 that can replace damaged or defective sortation modules, thereby minimizing down time of the conveyor assembly 201.

This position determination may need to be customized for branched conveyor assemblies, such as shown in FIG. 5B. For example, in one form, Zone F may be fed by two lines, which may be permissible because of the volume or size of items sorted to that zone or other reasons. The destination areas 214 should be matched to the appropriate sortation modules 206.

In this configuration in FIG. 5B, Zone F now has two branches of the conveyor assembly 201 leading to it. It is generally contemplated that each branch may have one or more sensors (such as photo eyes/photoelectric sensors) to determine when a product has been diverted and/or when a branch or destination is full. In one form, a visual or auditory alert can be provided to notify and employee that a branch or destination is full and needs to be cleared manually.

In another form, a control circuit 216 may be configured to select an alternative destination area 214 when the branch or destination area 214 is full. In other words, the system 200 can send products to the second destination for Zone F if the first is detected to be full (and vice versa if the second destination is the default and is detected to be full). Also, FIG. 5B shows that Zone G is lost due to the branched configuration. In this form, the control circuit 216 may combine the products that would have been sorted to Zone G into a different zone. This new zone sort decision may be based on such facts as the expected zone case count or volume (the product is assigned to the new zone with the fewest expected products). As another example, the new zone sort decision may be based on the closest physical destination to the original, i.e., the closest zone or an adjacent zone.

Figure 7:
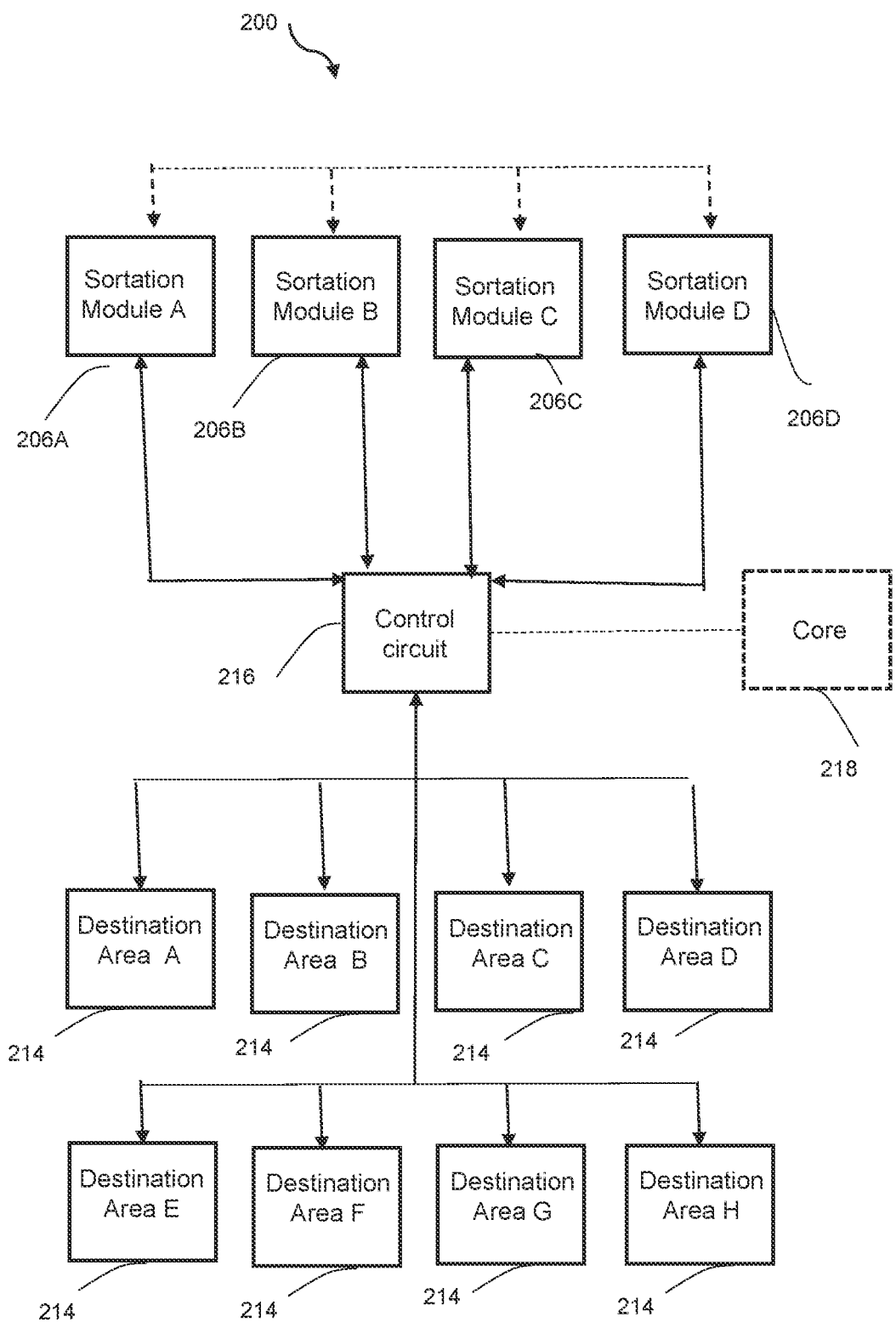
FIG. 7 is a block diagram in accordance with several embodiments.

FIG. 7 shows a block diagram showing various components of the exemplary system 200. In one form, the control circuit may be in communication with several (in this example, four) sortation modules 206A-D. The control circuit may include a controller core 218 that communicates with the sortation module 206A-D to track their relative positions. The control circuit 216 may receive input in the form of sortation criteria in which certain types of products are to be sorted to the same destination. The control circuit 216 may assign destination areas 210A-G to the sortation module 206A-D in the appropriate position.

Figure 8:
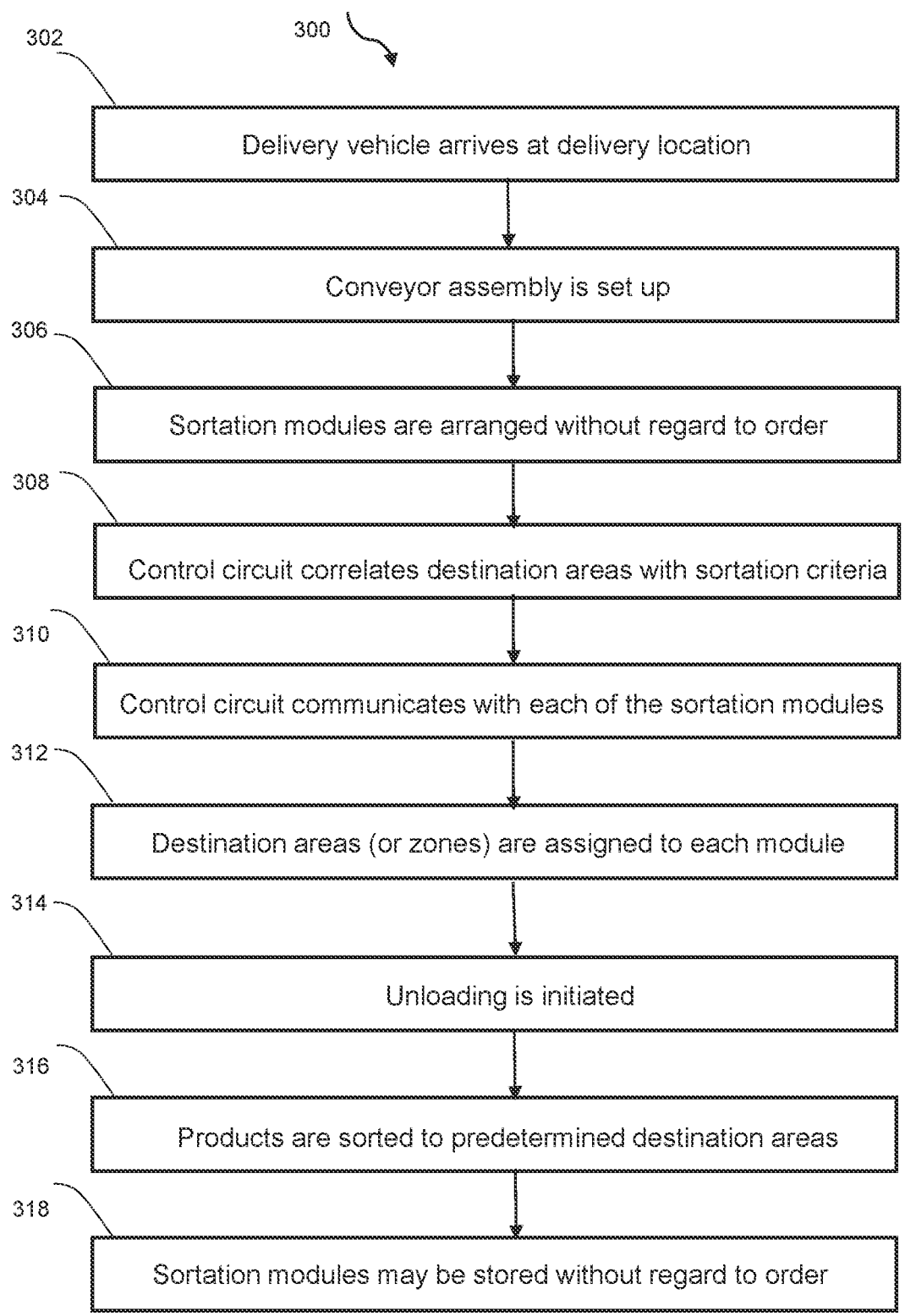
FIG. 8 is a flow diagram in accordance with several embodiments.

FIG. 8 shows an exemplary process 300 for unloading and sorting using interchangeable sortation modules 206. At block 302, a delivery vehicle arrives at a delivery location, such as at a loading dock of a shopping facility, and at block 304, the conveyor assembly (such as conveyor assembly 100 described above) is set up or has been set up already prior to delivery. At block 306, the sortation modules are arranged in no particular order relative to one another. They may be arranged in any desired number and geometric pattern. At blocks 308-12, the control circuit correlates the destination areas (or zones) with the desired sortation criteria, communicates with the sortation modules, and assigns a destination areas to a sortation module that is in the appropriate position. At blocks 314 and 316, the unloading operation commences, and products are sorted to destination areas in accordance with the sortation criteria. After the sorting operation is completed, the sortation modules may be stored without a need to track the order of the sortation modules for future unloading and sorting operations.

In another form, there is disclosed a system 400 that uses a product identification module 404 to identify the product and to access sortation criteria relating to the product. In some conventional approaches, reading a product label may not provide information specific to that product that might be accessible at a shopping facility or other location where the conveyor assembly is operating. Here, in contrast, it is contemplated that the control circuit 416 in cooperation with the product identification module 404 is able to identify the product and cross-reference information, possibly from multiple sites and sources. System 400 addresses a product identification module 404, and the nature of sortation modules is less significant.

Figure 9:
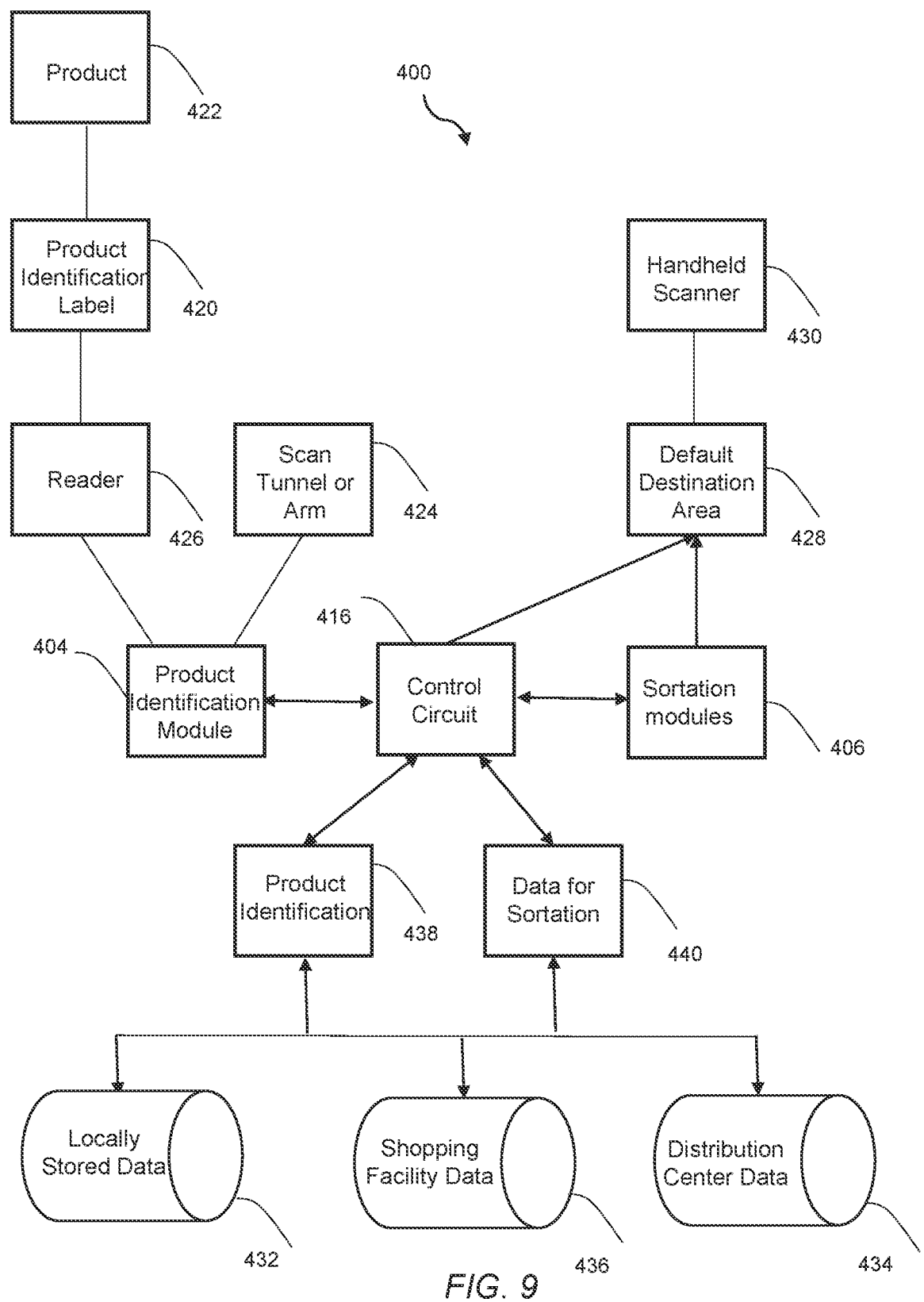
FIG. 9 is a block diagram in accordance with several embodiments.

Referring to FIG. 9, the production identification module 404 may generally be in any shape suitable for reading identification labels 420 on products 422. In one form, the product identification module 404 is a scan tunnel or arm 424 extending above a plurality of rollers that support and propel the products 406 therethrough. The product identification module 404 includes a reader 426 for reading the identification labels 420, and as mentioned above, the reader 426 may be any of various known reader types, such as a bar code reader, an RFID reader, an NFC reader, a laser imager, an optical sensor, an image processor, or a text capture device. The production identification module 404 may be in any general form as long as its reader 426 is properly oriented for reading identification labels 420 on products 422 passing nearby or through it. In another form, the product identification module 404 may include multiple readers for multi-position scanning to avoid failure to scan based on faulty label orientation. For example, the readers may be over head, underneath, along the sides, between rollers, and/or front or rear facing readers with respect to the product.

The data from the identification label 420 is transmitted to control circuit 416. If the product identification module 404 is unable to read the label 420 (such as because of improper orientation or a damaged label), the control circuit 416 communicates with the sortation modules 406 to divert the product 422 to a predetermined (or default) destination area 428 for unscannable products. A user with a handheld scanner 430 may then attempt to manually scan the label 420, and the reading from this scanner 430 may be transmitted to the control circuit 416. At that point, the product 422 may be placed on the sortation modules 406 for sortation, the user may manually deposit the product 422 in a destination area, or the product 422 may be left for further handling after sortation is completed. Alternatively, instead of attempted rescanning, the product may be taken manually to an appropriate destination area.

Once the product 422 is identified, it is contemplated that the control circuit 416 will use the product identification 438 to access other data (sortation data 440) relating to the product as sortation criteria to selectively determine the destination area for the product 422. It is contemplated that a sortation criteria has been selected by the user, and the control circuit 416 will access product data 440 to determine the destination area in view of the selected sortation criteria. In one form, it is contemplated that the control circuit 416 accesses the product data in any of various ways, such as via push, pull, or direct access to a database.

In one form, the product data may be stored in a local database 432 associated with the control circuit 416. For example, the product data may be communicated via flat file(s) with a small fixed number of fields that might be sent to designated file directories on a controller core (or a shopping facility server or a cloud computing system). In one form, one file might contain certain data from a distribution center server (the source of the shipment of products) that would enable product identification 438 (such as by mapping of the identification label 420 to the product 422), while a second file might come from the shopping facility server (or from a remote central headquarters) and may contain the product data used for sorting and determining the destination areas, such as the product location information within the shopping facility (i.e., department/category/sequence and aisle location(s)). This file transfer may occur on a daily interval or within some other predetermined time interval, and the control circuit 416 may check for new files each time a sortation operation is initiated. In one form, if the control circuit 416 fails to locate and identify any new flat files, it may note this failure but continue sortation operations utilizing data from the previous flat files.

In another form, the control circuit 416 may wirelessly access the server of the shipping source (or distribution center) and the server of the shopping facility to access this data. In one form, the product label 420 may be a label corresponding to a specific merchandise distribution center, which is the shipping source for the shipment of products. It is contemplated that, once the distribution center is identified via the label 420, its database(s) may be queried for additional data regarding the shipment of products, i.e., "backtracking" information from the distribution center. In this example, the control circuit 416 may identify the product by accessing the distribution center database 434 and mapping the scanned identification label 420 to the corresponding product 422. It may then access the shopping facility database 436 (or remote central headquarters database) to determine the product data used for sorting, such as the product location information within the shopping facility (i.e., department and aisle location). It is generally contemplated that live access to shopping facility and shipping source databases will be a preferred approach.

Of course, the product identification 438 and other data may be collected by some combination of local and remote databases. As another example, to identify the product, the control circuit may access distribution center data in several ways (either via push, pull, or direct access to the shipping source/distribution center database). Once the product is identified, the product may be linked to other distribution center data (acquired via any of the above approaches), shopping facility data, and/or any locally stored data in order to determine the destination.

Figure 10:
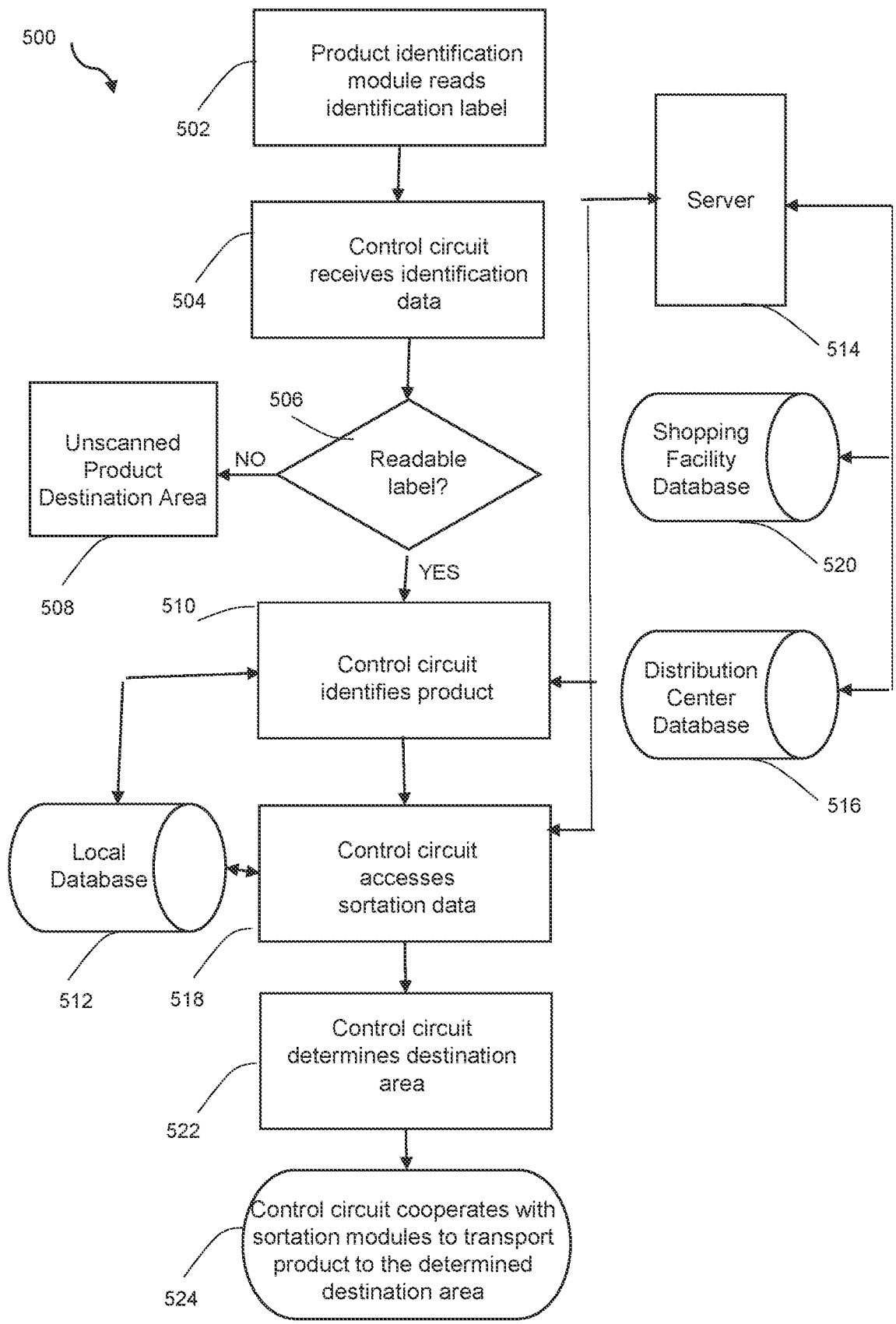
FIG. 10 is a flow diagram in accordance with several embodiments.

Referring to FIG. 10, in one form, there is disclosed a process 500 that uses a production identification module 402. The module reads a product identification label, and a control circuit uses this data to both identify the product and to access sortation criteria relating to the product. It is generally contemplated that the control circuit preferably accesses real time data during the sortation procedure to determine the appropriate destination area based on sortation criteria selected by the user.

At block 502, the product identification module reads the identification label. As described above, the module may be any of various structures. Further, the module may include any of various types of known readers, and the label may be any of various machine readable codes. At block 504, the control circuit receives the identification data read by the product identification module.

At block 506, the control circuit determines if the identification is readable. If it is not readable, the control circuit communicates with the sortation modules to direct the product to an unscannable product destination area, as shown at block 508. In other words, when the reader cannot read the label, the product is identified as unknown, and the system can direct the unidentified product to a predefined "manual intervention" staging zone. The product will be handled manually at that destination area.

At block 510, the control circuit identifies the product. It may make this identification based on accessing any of various databases. For example, in one form, it may access a local database 512 that is updated periodically with data mapping the label to the product and that is downloaded to a memory device or database that the control circuit can access without accessing a server. In another form, the control circuit may wirelessly communicate via server 514 with a distribution center database 516, the source of the shipment of products.

At block 518, following identification of the product, the control circuit accesses sortation data related to the product. Processing speed is a consideration, so accessing only the necessary data may be desirable as that will increase processing and sorting speed, as well as reduce data transmission cost and errors. It is contemplated that the user has previously selected one of various types of sortation criteria for the sortation of products. In one form, there may be "default profiles" that have been created to address known circumstances. In another form, the user may customize a profile to adapt the sortation criteria to circumstances at the shopping facility. Also, as addressed above, automatic dynamic configuration may be available to re-set destination areas when a sortation module is impaired or non-functional.

At this step, it is contemplated that the control circuit will access the specific product information corresponding to the sortation criteria. For example, it may have been determined that the sortation criteria would be the sales location in the shopping facility, so the relevant product information may be the department and/or aisle where the product is sold. In this example, the control circuit may wirelessly access the shopping facility database 520 to collect this relevant product information. Alternatively, it may have been downloaded and accessible via a local database 512.

At block 522, the control circuit determines the sortation destination area for the product. In this example, certain sortation destination areas may correspond to specific departments, aisles, or geographical areas of the shopping facility. At block 524, the control circuit communicates with the sortation modules to transport the product to the appropriate destination area.

In another form, there is disclosed a smart routing system 600. The system may use the conveyor assembly and modules described above, but the nature of the modules is less significant for this smart routing system 600 (so other types of modules may be used). A user may select certain sortation criteria suitable for sorting and may modify this criterion prior to any sorting operation and provide a systematic approach to sorting. This flexible approach allows a user to prioritize the criteria and to develop algorithms providing weight to various product factors. In the shopping facility context, the sortation criteria may be customized to each store's individual needs and allows consideration of different factors.

Figure 11:
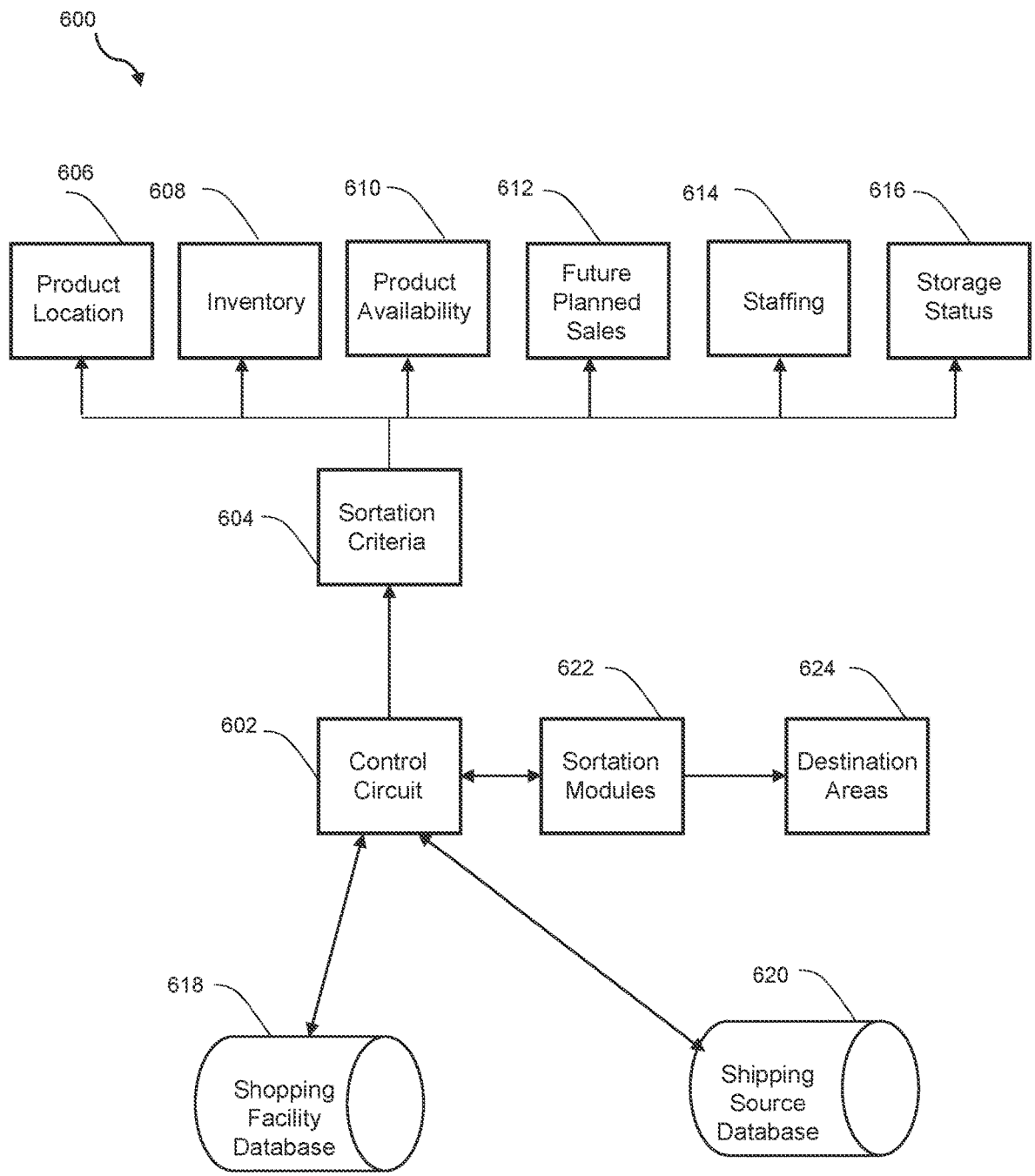
FIG. 11 is a block diagram in accordance with several embodiments.

Referring to FIG. 11, the system 600 includes a control circuit 602 that uses any of various sortation criteria 604 to determine the sorting of products by the conveyor assembly. It is generally contemplated that the various sorting approaches and algorithms may be developed and inputted prior to the sorting operation and, when a new sorting operation is to be initiated, the user can select any one of these approaches suitable for the circumstances. The system 600 may use multiple tiers or a prioritization of sortation criteria, based on multiple data points, rules, and algorithms. It is generally contemplated that the sorting criteria may use data from multiple sources, including local databases, shipping source databases (such as a distribution center that ships the product and has data regarding the details of the shipment), and shopping facility (or central headquarters) databases. In other words, the control circuit 602 engages in data processing, may "grab" information from multiple source, and runs an algorithm to determine the destination areas 624.

Some illustrations of sorting approaches are provided as follows. At block 606, the sortation criteria 604 may be based (entirely or in part) on the product location within the shopping facility. This product location information may include department, category, aisle, and/or other sales location information for the product at the shopping facility. The control circuit 602 may assign (and/or the user may input) different product locations to one or more of the destination areas 624 of the conveyor assembly.

At block 608, the sortation criteria 604 may be based (entirely or in part) on the product inventory within the shopping facility. This product inventory information may be based on several different types of inventory measurements and may include, for example, on-hand inventory and/or shelf capacity for the product at the shopping facility. The control circuit 602 may assign (and/or the user may input) different inventory categories to one or more of the destination areas 624 of the conveyor assembly.

At block 610, the sortation criteria 604 may be based (entirely or in part) on the product availability within the shopping facility. This product availability information may be based on several different types of data points, which may include, for example, sales, return on sales, and/or lost sales for the product at the shopping facility. The control circuit 602 may assign (and/or the user may input) different product availability categories to one or more of the destination areas 624 of the conveyor assembly.

At block 612, the sortation criteria 604 may be based (entirely or in part) on future planned sales of the product at the shopping facility. This planning information may be based on several different types of data points, which may include, for example, new product status, not yet on shelf status and/or the date that the product will be available for sale at the shopping facility. The control circuit 602 may assign (and/or the user may input) different future planned sales categories to one or more of the destination areas 624 of the conveyor assembly.

At block 614, the sortation criteria 604 may be based (entirely or in part) on staffing at the shopping facility during the unloading/sorting operation. For example, if there is not much staffing available for unloading and/or sorting, it may be desirable to reduce the number of destination areas or to assign a destination area for products requiring immediate handling. The control circuit 602 may assign (and/or the user may input) one or more of the destination areas 624 of the conveyor assembly based on staffing.

At block 616, the sortation criteria 604 may be based (entirely or in part) on the product storage status at the shopping facility. For example, the product may be flagged for storage in the back room, stock room, or warehouse of the shopping facility. The product may be coded with a special code indicating a large quantity of that product in the shipment, which should therefore be sent to a different area of the shopping facility (such as a back room or storage area, not a shelf). The control circuit 602 may assign (and/or the user may input) one or more of the destination areas 624 of the conveyor assembly based on product storage status.

Of course, the sortation criteria 604 may be based on several different sortation criteria outlined above with different weight and/or prioritization given to different factors. Different destination areas 624 may be assigned based on different combinations of sortation criteria. For example, seven of eight destination areas may be based on product location within the shopping facility, while the eighth destination area is based on low inventory of the product at the shopping facility.

Another basis for sortation is the separation of high priority products from low priority products. High priority products may be assigned to a specific destination area 624 to make sure that they are handled immediately. For example, these high priority products may include products specifically ordered by a customer, products with limited availability that have been ordered from another shopping facility, or limited time promotional products. Also, low priority products may be assigned to a specific destination area 624 to make sure that they are stored or binned. For example, a low priority product may include products with high inventory at the shopping facility.

Further, as addressed above, it is generally contemplated that the data to which the sortation criteria are applied are available from a shopping facility database 618 and/or from a shipping source (such as a distribution center) database 620. In one form, it is generally contemplated that a combination of data from both the shopping facility and from the shipping source may be used. Further, shipping information, such as delivery quantity information, may be downloaded to the shopping facility database upon arrival of the delivery vehicle. As one example, the control circuit 602 may access shopping facility inventory to determine that quantity of the product at the shopping facility falls below a certain minimum threshold and may also access shipping source data to determine the quantity and types of products being shipped. The control circuit 602 may direct a certain quantity of the product to one destination area for immediate stocking on shopping facility shelves ("priority" products) and may direct the remaining quantity to a second destination area for storage in a back room ("to be binned" products). Once the sortation criteria are determined, the control circuit activates the sortation modules 622 to direct the products to the appropriate destination areas 624.

Figure 12:
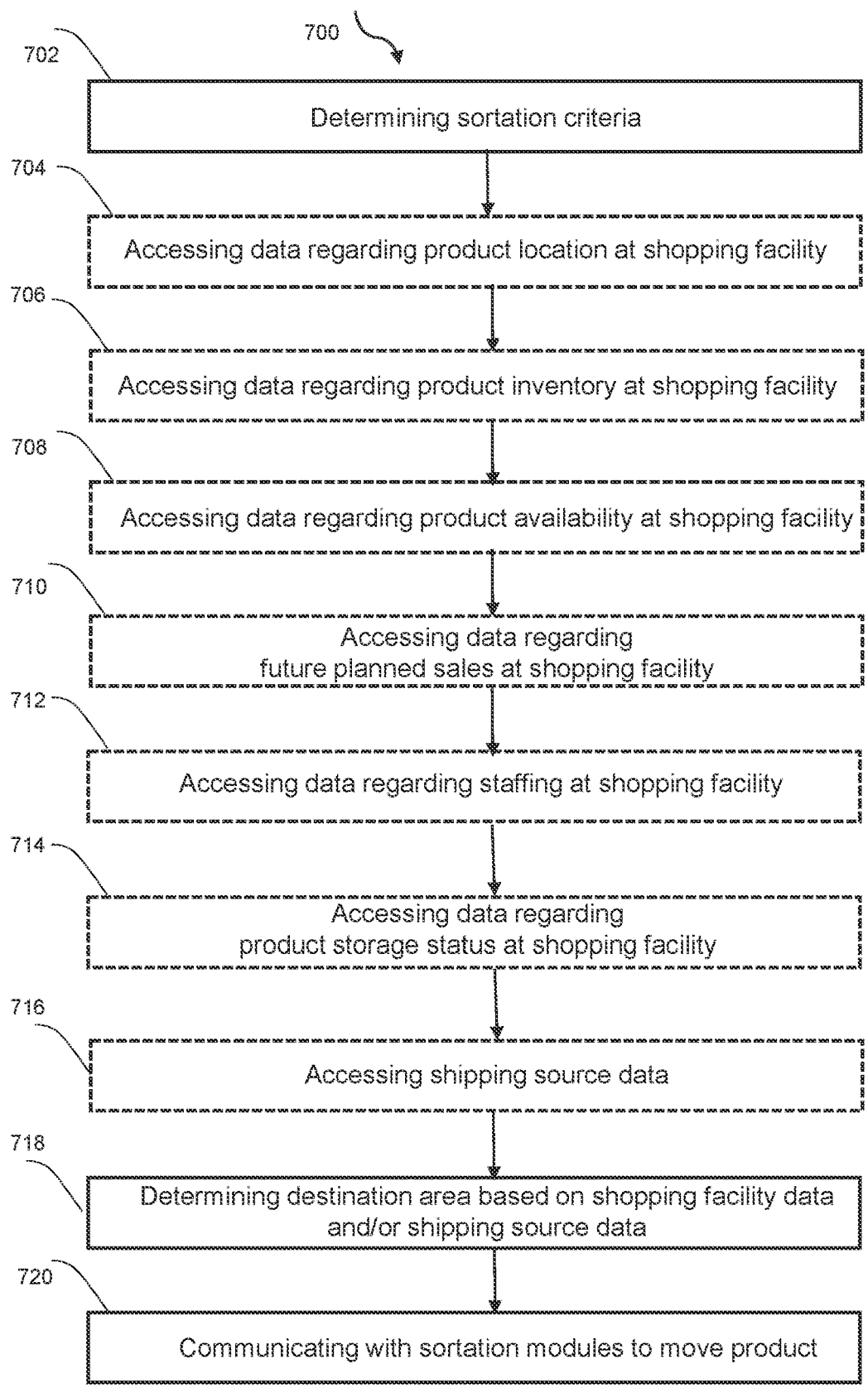
FIG. 12 is a flow diagram in accordance with several embodiments.

Referring to FIG. 12, there is shown one form of a process 700 that may apply smart routing system 600. At block 702, the sortation criteria may be determined. As explained above, the sortation criteria may be based, at least partially, on such factors as product location, product inventory, product availability, future planned sales, staffing, and/or product storage status at the shopping facility. Further, the destination areas may be determined based on some combination of factors and may be customized and prioritized as appropriate to the circumstances. At blocks 704, 706, 708, 710, 712, and 714, the shopping facility database or databases may be accessed to collect data corresponding to these sortation criteria. At block 716, the shipping source (or distribution center) database or databases may be accessed to collect shipping source data, such as, for example, quantity and type of products shipped to the shopping facility. At block 718, the destination area for the product is determined based on the sortation criteria and product data. At block 720, the sortation modules direct each product to the selected destination area.

In one form, the various components of a conveyor assembly described above are stand-alone embodiments (interchangeable sortation modules, product identification module, smart routing system, etc.) and do not necessarily require components of other embodiments. However, it is also contemplated that the various components may be combined into an overall system for receiving, unloading, and sorting shipments of product at a shopping facility. It is contemplated that this overall receiving system may use some or all of the components.

Figure 13:
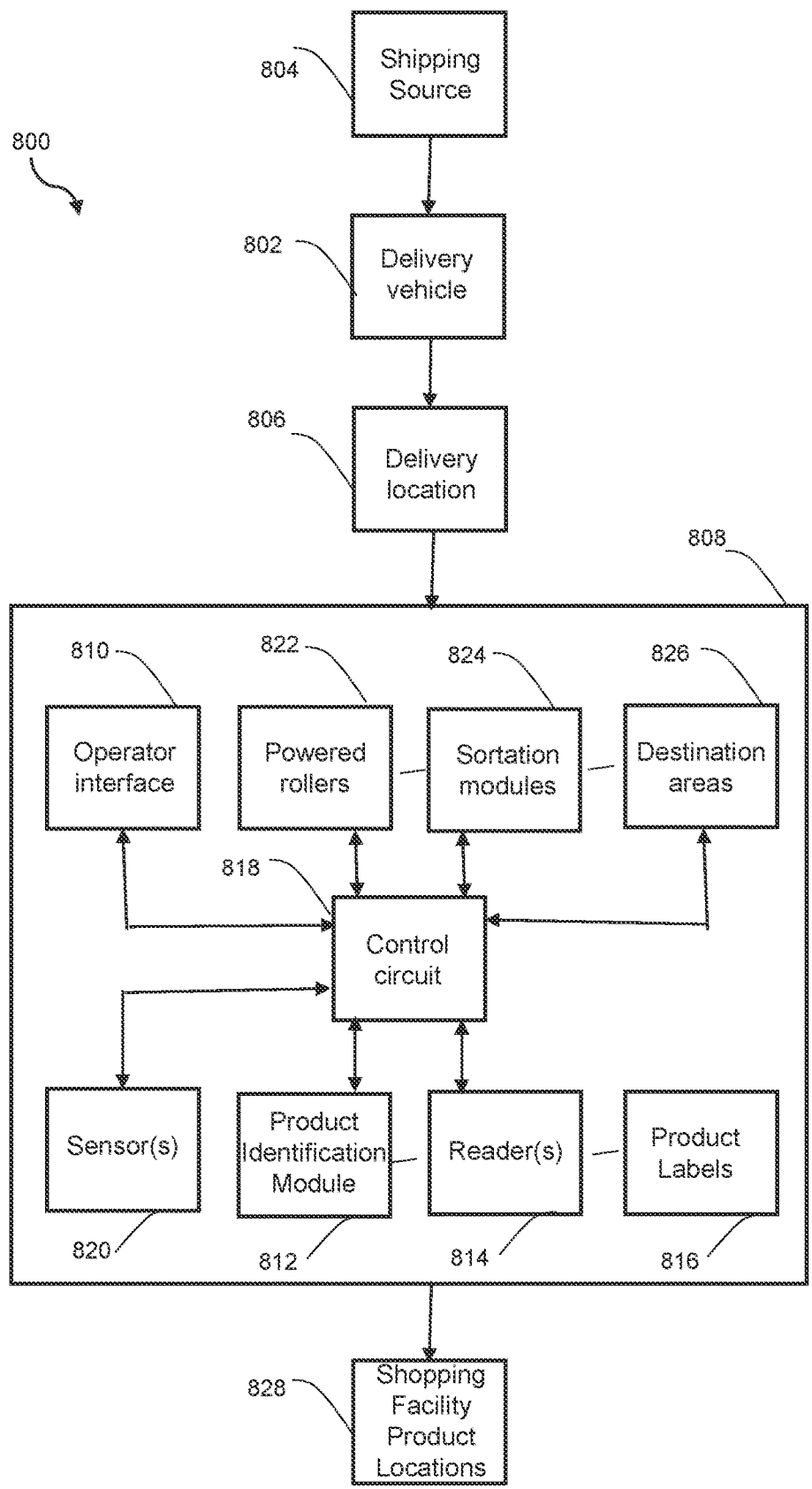
FIG. 13 is a block diagram in accordance with several embodiments.

Referring to FIG. 13, in one form, there is shown a block diagram of an overall receiving system 800. As can be seen, a delivery vehicle 802 transports products from a shipping source 804 (such as a merchandise distribution center) to a delivery location 806 at a shopping facility (such as a loading docking. The products are unloaded and sorted using a conveyor assembly 808, which may be activated via an operator interface 810. A product identification module 812 includes one or more readers 814 that reads the identification data from product labels 816, which is transmitted to control circuit 818. The conveyor assembly 808 may include sensors 820 that detect and/or track product position to allow the control circuit 818 to operate powered rollers 822 in the sortation modules 824 to maintain the minimum distance between products. The control circuit 818 may identify the products by accessing a shipping source database (or a local database) and may sort the products to destination areas 826 via sortation modules 824 using data from shipping source, shopping facility, and/or local databases. Following the sorting operation, products may be transported from destination areas 826 to their appropriate shopping facility product locations 828, such as by pallets and carts.

Figure 14:
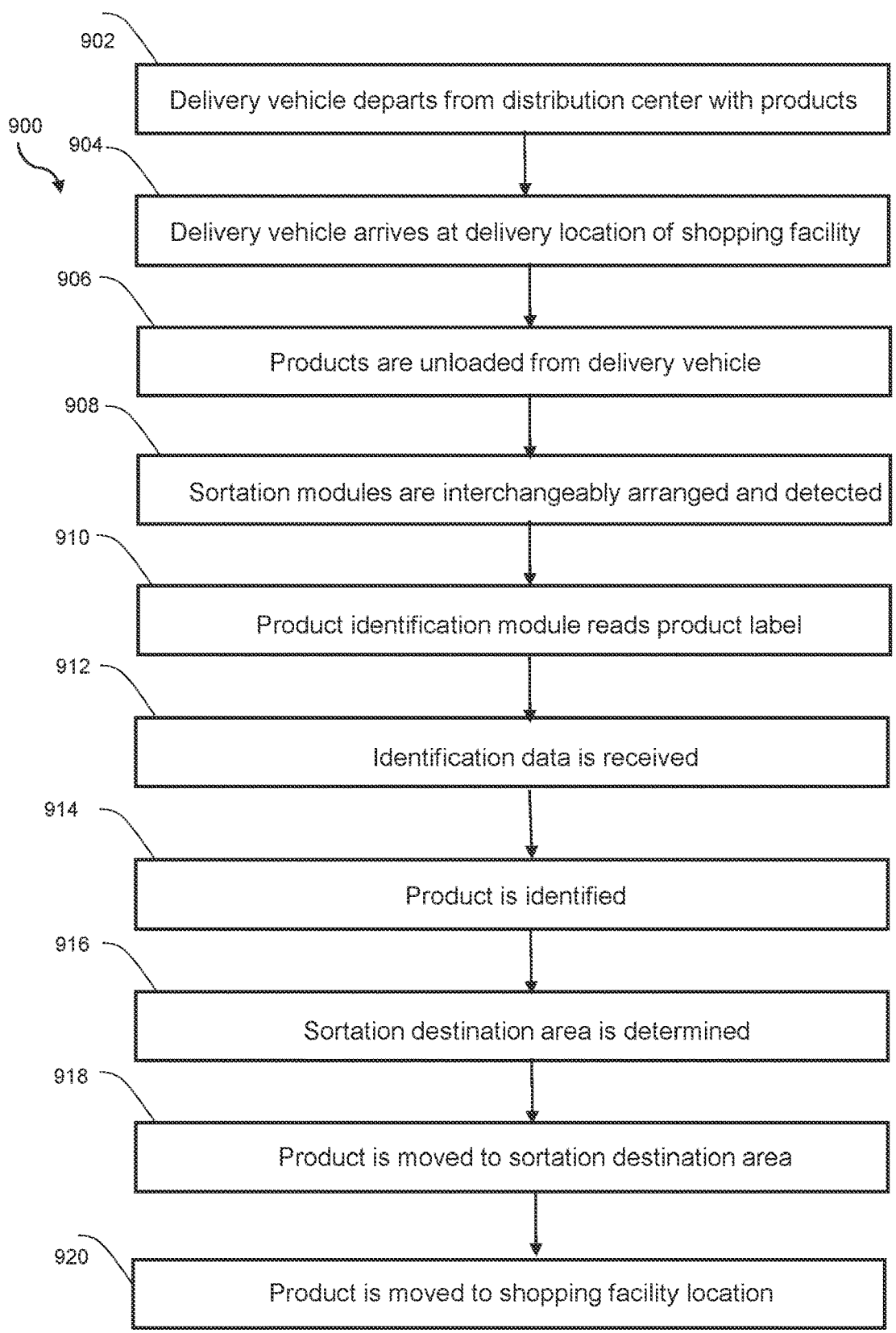
FIG. 14 is a flow diagram in accordance with several embodiments.

Referring to FIG. 14, in one form, there is shown a flow diagram of an overall receiving process 900. At blocks 902, 904, and 906, a delivery vehicle departs from a distribution center with a shipment of products, later arrives at the delivery location of a shopping facility, and products are unloaded. At block 908, the conveyor assembly is set up, and sortation modules may be arranged interchangeably, regardless of order. At blocks 910, 912, and 914, the product identification module reads product labels, and the control circuit receives and identifies the products. At blocks 916, 918, and 920, sortation destination areas are determined by applying sortation criteria to product data, products are moved to appropriate sortation destination areas via the sortation modules, and products are then transported to the corresponding shopping facility locations.

In the description above, a number of different embodiments of systems and processes have been disclosed. It should be understood that the specific features and limitations of each system and process may be combined with other systems and processes. For example, the following is one such combination: (1) the conveyor assembly with interchangeable sortation modules whose positions are detected by the control circuit and that may be matched with destination areas if they are interchanged or replaced; (2) the conveyor assembly with powered roller(s) in each sortation module to allow the control circuit to maintain a certain minimum distance between products; (3) the conveyor assembly with a product identification module that accesses multiple databases to identify the product and access other product data; and (4) the smart routing system for a conveyor assembly that may use and/or combine various sortation criteria and access shipping source and/or shopping facility databases to determine destination areas for the products.

In some embodiments involving sortation modules, there is provided a conveyor assembly comprising: a plurality of sortation modules configured to move a product to one of a predetermined plurality of sortation destination areas; a control circuit operatively coupled to each of the sortation modules, the control circuit configured to: determine the destination area for the product; and communicate with the sortation module corresponding to the determined destination area to divert the product to the determined destination area; wherein the control circuit and the plurality of sortation modules cooperate to reconfigure sortation destination areas to match positions of the sortation modules when one sortation module is interchanged or replaced with another sortation module.

Further implementations of these embodiments are provided. For example, in some implementations, each sortation module of the conveyor assembly may comprise: a uni-directional travel portion with a plurality of rollers configured to propel the product in a first direction along the rollers; and a bi-directional sorting portion with a first set of rollers configured to propel the product in the first direction and a second set of rollers to divert the product in a second direction to a sortation destination area. In some embodiments, one sortation module may be configured for coupling to multiple parts of a second sortation module such that the plurality of sortation modules define a plurality of different geometric arrangements. In some embodiments, the travel portion and the sorting portion of each sortation module may form a single unitary structure. In some embodiments, at least one of the rollers of each sortation module may comprise a powered roller with an adjustable rotation speed. In some embodiments, the conveyor assembly may comprise a plurality of sensors disposed at predetermined locations on the plurality of sortation modules to detect positions of the product traveling along the plurality of sortation modules. In some embodiments, the control circuit may be operatively coupled to the powered roller of each sortation module and to the plurality of sensors, and the control circuit may be configured to: determine the position of the product relative to the position of an adjacent product on the plurality of sortation modules; and activate a powered roller to adjust the speed of the product to maintain a predetermined minimum separation distance between it and the adjacent product. In some embodiments, the control circuit may comprise a controller core that communicates with each sortation module to track the position of each sortation module. In some embodiments, each sortation module may communicate with other sortation modules to track the position of each sortation module relative to one another. In some embodiments, each sortation module may comprise a conveyor coupling portion having a plurality of rollers and coupling the sorting portion to a destination area, and the conveyor coupling portion may be collapsible to facilitate storage of the sortation module.

In some embodiments involving sortation modules, there is provided a method of delivering products along a conveyor assembly comprising: providing a conveyor assembly comprising a plurality of sortation modules and configured to move products to a predetermined plurality of sortation destination areas; by a control circuit, determining a destination area for a product from the predetermined plurality of sortation destination areas; propelling the product along the plurality of sortation modules; communicating with a sortation module corresponding to the determined destination area; by the control circuit, diverting the product to the determined destination area; and by the control circuit, reconfiguring the predetermined plurality of sortation destination areas to match positions of the sortation modules when one sortation module is interchanged or replaced with another sortation module.

Further implementations of these embodiments are provided. For example, in some implementations, each sortation module may comprise: a uni-directional travel portion with a plurality of rollers configured to propel the product in a first direction along the rollers; and a bi-directional sorting portion with a first set of rollers configured to propel the product in the first direction and a second set of rollers to divert the product in a second direction to a sortation destination area. In some embodiments, the uni-directional travel portion of one sortation module may be configured for coupling to multiple parts of a second sortation module such that the plurality of sortation modules define a plurality of different geometric arrangements. In some embodiments, the travel portion and the sorting portion of each sortation module form a single unitary structure. In some embodiments, at least one of the rollers of each sortation module may comprise a powered roller with an adjustable rotation speed. In some embodiments, a plurality of sensors may be disposed at predetermined locations on the plurality of sortation modules to detect positions of the product traveling along the plurality of sortation modules. In some embodiments, the control circuit may: determine the position of the product relative to the position of an adjacent product on the plurality of sortation modules; and activate a powered roller to adjust the speed of the product to maintain a predetermined minimum separation distance between it and the adjacent product. In some embodiments, a controller core may communicate with each sortation module to track the position of each sortation module. In some embodiments, each sortation module may communicate with other sortation modules to track the position of each sortation module relative to one another. In some embodiments, each sortation module may further comprise a conveyor coupling portion having a plurality of rollers and coupling the sorting portion to a destination area, the conveyor coupling portion being collapsible to facilitate storage of the sortation module.

In some embodiments involving a product identification module, there is provided a conveyor assembly to distribute products to a plurality of destination areas comprising: a product identification module configured to read identification data from an identification label disposed on a product; a plurality of sortation modules configured to move the product to one of a predetermined plurality of sortation destination areas; a control circuit operatively coupled to the product identification module and to each of the sortation modules, the control circuit configured to: receive the identification data from the product identification module to determine the destination area for the product; and cooperate with the plurality of sortation modules to move the product to the determined destination area; wherein the control circuit is configured to use the product identification data to access other data relating to the product as sortation criteria to selectively determine the destination area for the product.

Further implementations of these embodiments are provided. For example, in some implementations, the product identification module may comprise a scan tunnel or arm positioned above or adjacent one of the plurality of sortation modules. In some embodiments, the product identification module may comprise at least one of a bar code reader, an RFID reader, an NFC reader, a laser imager, an optical sensor, an image processor, or a text capture device for reading the identification label. In some embodiments, the product identification module may be configured to read both identification data and the other data relating to the product from the identification label. In some embodiments, the product identification module may be configured to read an identifier corresponding to a shipment of products and the control circuit may be configured to access the other data relating to the product based on the identifier. In some embodiments, the control circuit may be configured to wirelessly access the other data relating to the product from one or more databases. In some embodiments, the control circuit may be configured to move a product to a predetermined destination area when the product identification module cannot read the identification label disposed on the product. In some embodiments, the system may further comprise a handheld identification label reader configured to read the identification label at the predetermined destination area.

In some embodiments involving a product identification module, there is provided a method of distributing products to a plurality of destination areas comprising: providing a conveyor assembly configured to move products to a predetermined plurality of destination areas; by a product identification module, reading identification data from an identification label disposed on a product; by a control circuit, receiving the identification data to determine a destination area for the product from among the predetermined plurality of destination areas; by the control circuit, using the product identification data to access other data relating to the product as sortation criteria to selectively determine the destination area for the product; and moving the product to the selected destination area.

Further implementations of these embodiments are provided. For example, in some implementations, the product identification module may comprise a scan tunnel or arm positioned above or adjacent one of the plurality of sortation modules. In some implementations, the product identification module may comprise at least one of a bar code reader, an RFID reader, an NFC reader, a laser imager, an optical sensor, an image processor, or a text capture device for reading the identification label. In some implementations, the control circuit may determine the source of a shipment containing the product from the identification label. In some implementations, the product identification module may read an identifier corresponding to a shipment of products, and the control circuit may access the other data relating to the product based on the identifier. In some implementations, the control circuit may wirelessly access the other data relating to the product from one or more databases. In some implementations, the control circuit may move a product to a predetermined destination area when the product identification module cannot read the identification label disposed on the product. In some implementations, a handheld identification label reader may be configured to read the identification label at the predetermined destination area.

In some embodiments involving a smart routing system, there is provided a smart routing system for sorting products shipped to a shopping facility along a conveyor assembly comprising: a plurality of sortation modules configured to move a product to one of a predetermined plurality of sortation destination areas; a control circuit operatively coupled to each of the sortation modules, the control circuit configured to: access at least one of shopping facility data and shipping data regarding the product; determine a destination area for the product based on at least one of the shopping facility data and the shipping data as sortation criteria; and communicate with the plurality of sortation modules to move the product to the determined destination area.

Further implementations of these embodiments are provided. For example, in some implementations, the control circuit may be configured to selectively determine the destination area for the product based on the combination of the shopping facility data and the shipping data. In some embodiments, the shipping data may include information regarding at least one of the quantity of the product and the types of products being shipped. In some embodiments, the control circuit may selectively determine the destination area based, at least in part, on at least one of the department, category, and sales location of the product in the shopping facility. In some embodiments, the control circuit may selectively determine the destination area based, at least in part, on shopping facility inventory information including at least one of the on-hand inventory, shelf capacity, and inventory status of the product at the shopping facility. In some embodiments, the control circuit may assign the product to a predetermined destination area for stocking of the product for sale to customers when the on-hand inventory at the shopping facility is below a predetermined minimum threshold. In some embodiments, the control circuit may selectively determine the destination area based, at least in part, on current product availability information at the shopping facility. In some embodiments, the control circuit may selectively determine the destination area based, at least in part, on shopping facility planning information regarding future planned sales of the product. In some embodiments, the control circuit may selectively determine the destination area based, at least in part, on shopping facility staffing information at the time of sorting of the product. In some embodiments, the control circuit may selectively determine the destination area based, at least in part, on the status of the product as to be stored in a storage area.

In some embodiments involving a smart routing method, there is provided a method for sorting products shipped to a shopping facility along a conveyor assembly comprising: providing a conveyor assembly with a plurality of sortation modules configured to move a product to one of a predetermined plurality of sortation destination areas; by a control circuit, accessing at least one of shopping facility data and shipping data regarding the product; by the control circuit, determining a destination area for the product based on at least one of the shopping facility data and the shipping data as sortation criteria; and by the control circuit, communicating with the plurality of sortation modules to move the product to the determined destination area.

Further implementations of these embodiments are provided. For example, in some implementations, the control circuit may selectively determine the destination area for the product based on the combination of the shopping facility data and the shipping data. In some embodiments, the shipping data may include information regarding at least one of the quantity of the product and the types of products being shipped. In some embodiments, the control circuit may selectively determine the destination area based, at least in part, on at least one of the department, category, and sales location of the product in the shopping facility. In some embodiments, the control circuit may selectively determine the destination area based, at least in part, on shopping facility inventory information including at least one of the on-hand inventory, shelf capacity, and inventory status of the product at the shopping facility. In some embodiments, the control circuit may assign the product to a predetermined destination area for stocking of the product for sale to customers when the on-hand inventory at the shopping facility is below a predetermined minimum threshold. In some embodiments, the control circuit may selectively determine the destination area based, at least in part, on current product availability information at the shopping facility. In some embodiments, the control circuit may selectively determine the destination area based, at least in part, on shopping facility planning information regarding future planned sales of the product. In some embodiments, the control circuit may selectively determine the destination area based, at least in part, on shopping facility staffing information at the time of sorting of the product. In some embodiments, the control circuit may selectively determine the destination area based, at least in part, on the status of the product as to be stored in a storage area.

Those skilled in the art will recognize that a wide variety of other modifications, alterations, and combinations can also be made with respect to the above described embodiments without departing from the scope of the invention, and that such modifications, alterations, and combinations are to be viewed as being within the ambit of the inventive concept.

What is claimed is:

1. A conveyor assembly comprising:
   a plurality of sortation modules configured to move a product to one of a predetermined plurality of sortation destination areas;
   a control circuit operatively coupled to each of the sortation modules, the control circuit configured to:
      determine the destination area for the product; and
      communicate with the sortation module corresponding to the determined destination area to divert the product to the determined destination area;
   wherein the control circuit and the plurality of sortation modules cooperate to reconfigure sortation destination areas to match positions of the sortation modules when one sortation module is interchanged or replaced with another sortation module.

2. The conveyor assembly of claim 1, wherein each sortation module comprises:
   a uni-directional travel portion with a plurality of rollers configured to propel the product in a first direction along the rollers; and
   a bi-directional sorting portion with a first set of rollers configured to propel the product in the first direction and a second set of rollers to divert the product in a second direction to a sortation destination area.

3. The conveyor assembly of claim 1, wherein one sortation module is configured for coupling to multiple parts of a second sortation module such that the plurality of sortation modules define a plurality of different geometric arrangements.

4. The conveyor assembly of claim 2, wherein the travel portion and the sorting portion of each sortation module form a single unitary structure.

5. The conveyor assembly of claim 2, wherein at least one of the rollers of each sortation module comprises a powered roller with an adjustable rotation speed.

6. The conveyor assembly of claim 5, further comprising a plurality of sensors disposed at predetermined locations on the plurality of sortation modules to detect positions of the product traveling along the plurality of sortation modules.

7. The conveyor assembly of claim 6, wherein the control circuit is operatively coupled to the powered roller of each sortation module and to the plurality of sensors, the control circuit configured to:
   determine the position of the product relative to the position of an adjacent product on the plurality of sortation modules; and
   activate the powered roller to adjust the speed of the product to maintain a predetermined minimum separation distance between it and the adjacent product.

8. The conveyor assembly of claim 1, wherein the control circuit comprises a controller core that communicates with each sortation module to track the position of each sortation module.

9. The conveyor assembly of claim 1, wherein each sortation module communicates with other sortation modules to track the position of each sortation module relative to one another.

10. The conveyor assembly of claim 2, wherein each sortation module further comprises a conveyor coupling portion having a plurality of rollers and coupling the sorting portion to a destination area, the conveyor coupling portion being collapsible to facilitate storage of the sortation module.

11. A method of delivering products along a conveyor assembly comprising:
   providing a conveyor assembly comprising a plurality of sortation modules and configured to move products to a predetermined plurality of sortation destination areas;
   by a control circuit, determining a destination area for a product from the predetermined plurality of sortation destination areas;
   propelling the product along the plurality of sortation modules;

communicating with a sortation module corresponding to the determined destination area;

by the control circuit, diverting the product to the determined destination area; and by the control circuit, reconfiguring the predetermined plurality of sortation destination areas to match positions of the sortation modules when one sortation module is interchanged or replaced with another sortation module.

12. The method of claim 11, wherein each sortation module comprises:

a uni-directional travel portion with a plurality of rollers configured to propel the product in a first direction along the rollers; and a bi-directional sorting portion with a first set of rollers configured to propel the product in the first direction and a second set of rollers to divert the product in a second direction to a sortation destination area.

13. The method of claim 12, wherein the uni-directional travel portion of one sortation module is configured for coupling to multiple parts of a second sortation module such that the plurality of sortation modules define a plurality of different geometric arrangements.

14. The method of claim 12, wherein the travel portion and the sorting portion of each sortation module form a single unitary structure.

15. The method of claim 12, wherein at least one of the rollers of each sortation module comprises a powered roller with an adjustable rotation speed.

16. The method of claim 15, wherein a plurality of sensors are disposed at predetermined locations on the plurality of sortation modules to detect positions of the product traveling along the plurality of sortation modules.

17. The method of claim 16, further comprising, by the control circuit:

determining the position of the product relative to the position of an adjacent product on the plurality of sortation modules; and activating the powered roller to adjust the speed of the product to maintain a predetermined minimum separation distance between it and the adjacent product.

18. The method of claim 11, further comprising, by a controller core, communicating with each sortation module to track the position of each sortation module.

19. The method of claim 11, further comprising, by each sortation module, communicating with other sortation modules to track the position of each sortation module relative to one another.

20. The method of claim 12, wherein each sortation module further comprises a conveyor coupling portion having a plurality of rollers and coupling the sorting portion to a destination area, the conveyor coupling portion being collapsible to facilitate storage of the sortation module.

* * * * *